United States Patent
Médioni

(10) Patent No.: US 9,836,853 B1
(45) Date of Patent: Dec. 5, 2017

(54) THREE-DIMENSIONAL CONVOLUTIONAL NEURAL NETWORKS FOR VIDEO HIGHLIGHT DETECTION

(71) Applicant: GOPRO, INC., San Mateo, CA (US)

(72) Inventor: Tom Médioni, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/256,874

(22) Filed: Sep. 6, 2016

(51) Int. Cl.
| | | |
|---|---|---|
| *G06T 1/00* | (2006.01) |
| *G06K 9/46* | (2006.01) |
| *G06N 3/04* | (2006.01) |
| *G06N 3/08* | (2006.01) |
| *G06T 7/20* | (2017.01) |

(52) U.S. Cl.
CPC .......... *G06T 7/2033* (2013.01); *G06K 9/4671* (2013.01); *G06N 3/04* (2013.01); *G06N 3/08* (2013.01); *G06T 2207/10016* (2013.01); *G06T 2207/20081* (2013.01); *G06T 2207/20084* (2013.01)

(58) Field of Classification Search
CPC ......... G06T 7/2033; G06T 2207/10016; G06T 2207/20084; G06T 2207/20081; G06K 9/4671; G06N 3/04; G06N 3/08
See application file for complete search history.

(56) References Cited

U.S. PATENT DOCUMENTS

| | | |
|---|---|---|
| 5,130,794 A | 7/1992 | Ritchey |
| 6,337,683 B1 | 1/2002 | Gilbert |
| 6,593,956 B1 | 7/2003 | Potts |

(Continued)

FOREIGN PATENT DOCUMENTS

| | | |
|---|---|---|
| WO | 2001020466 | 3/2001 |
| WO | 2009040538 | 4/2009 |

OTHER PUBLICATIONS

Tran et al., "Learning Spatiotemporal Features with 3D Convolutional Networks".*

(Continued)

*Primary Examiner* — Kenny Cese
(74) *Attorney, Agent, or Firm* — Sheppard Mullin Richter & Hampton LLP

(57) ABSTRACT

A three-dimensional convolutional neural network may include a preliminary layer group, one or more intermediate layer groups, a final layer group, and/or other layers/layer groups. The preliminary layer group may include an input layer, a preliminary three-dimensional padding layer, a preliminary three-dimensional convolution layer, a preliminary activation layer, a preliminary normalization layer, and a preliminary downsampling layer. One or more intermediate layer groups may include an intermediate three-dimensional squeeze layer, a first intermediate normalization layer, an intermediate three-dimensional padding layer, a first intermediate three-dimensional expand layer, a second intermediate three-dimensional expand layer, an intermediate concatenation layer, a second intermediate normalization layer, an intermediate activation layer, and an intermediate combination layer. The final layer group may include a final dropout layer, a final three-dimensional convolution layer, a final activation layer, a final normalization layer, a final three-dimensional downsampling layer, and a final flatten layer.

20 Claims, 20 Drawing Sheets

(56) References Cited

U.S. PATENT DOCUMENTS

| | | |
|---|---|---|
| 7,222,356 B1 | 5/2007 | Yonezawa |
| 7,483,618 B1 | 1/2009 | Edwards |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | David Mcintosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0139485 A1* | 5/2015 | Bourdev ............ G06K 9/00362 382/103 |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |

(56) References Cited

U.S. PATENT DOCUMENTS

| | | |
|---|---|---|
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |

OTHER PUBLICATIONS

FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.

PCT International Search Report and Written Opinion for PCT/US2015/023680, dated Oct. 6, 2015, 13 pages.

PCT International Written Opinion for PCT/US20151041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Schroff et al., "FaceNet: A Unified Embedding for Face Recognition and Clustering," IEEE Conference on computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

Ernoult, Emeric, "How to Triple Your YouTube Video Views with Facebook", SocialMediaExaminer.com, Nov. 26, 2012, 16 pages.

Ricker, "First Click: TomTom's Bandit camera beats GoPro with software" Mar. 9, 2016 URL: http://www.theverge.com/2016/3/9/11179298/tomtom-bandit-beats-gopro (6 pages).

PCT International Search Report and Written Opinion for PCT/US15/18538, dated Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

\* cited by examiner

| Layer | Filters | Patch | Stride | Input Dimensions, Frames, Channels | Output Dimensions, Frames, Channels |
|---|---|---|---|---|---|
| preliminary layer group 310 | | | | | |
| input layer 401 | -- | -- | -- | 112, 112, 16, 3 | 112, 112, 16, 3 |
| pre-3D padding layer 403 | -- | 2x3x3 | -- | 112, 112, 16, 3 | 118, 118, 20, 3 |
| pre-3D convolution layer 404 | 96 | 7x7x2 | 2 | 118, 118, 20, 3 | 56, 56, 19, 96 |
| pre-activation layer 405 | -- | -- | -- | 56, 56, 19, 96 | 56, 56, 19, 96 |
| pre-norm layer 406 | -- | -- | -- | 56, 56, 19, 96 | 56, 56, 19, 96 |
| pre-3D downsample layer 407 | -- | 3x3x2 | 2 | 56, 56, 19, 96 | 27, 27, 9, 96 |
| intermediate layer group A 321 | | | | | |
| inter-A 3D squeeze layer 411 | 32 | 1x1x1 | 1 | 27, 27, 9, 96 | 27, 27, 9, 32 |
| inter-A norm layer A 412 | -- | -- | -- | 27, 27, 9, 32 | 27, 27, 9, 32 |
| inter-A 3D padding layer 413 | -- | -- | -- | 27, 27, 9, 32 | 29, 29, 11, 32 |
| inter-A 3D expand layer A 414 | 128 | 3x3x3 | 1 | 29, 29, 11, 32 | 27, 27, 9, 128 |
| inter-A 3D expand layer B 415 | 128 | 1x1x1 | 1 | 27, 27, 9, 32 | 27, 27, 9, 128 |
| inter-A concat layer 416 | -- | -- | -- | 27, 27, 9, 128 27, 27, 9, 128 | 27, 27, 9, 256 |
| inter-A norm layer B 417 | -- | -- | -- | 27, 27, 9, 256 | 27, 27, 9, 256 |
| inter-A activation layer 418 | -- | -- | -- | 27, 27, 9, 256 | 27, 27, 9, 256 |
| inter-A 3D bypass layer 410 | 256 | 1x1x1 | 1 | 27, 27, 9, 96 | 27, 27, 9, 256 |
| inter-A combine layer 419 | -- | -- | -- | 27, 27, 9, 256 27, 27, 9, 256 | 27, 27, 9, 256 |
| intermediate layer group B 322 | | | | | |
| inter-B 3D squeeze layer 421 | 32 | 1x1x1 | 1 | 27, 27, 9, 256 | 27, 27, 9, 32 |
| inter-B norm layer A 422 | -- | -- | -- | 27, 27, 9, 32 | 27, 27, 9, 32 |
| inter-B 3D padding layer 423 | -- | -- | -- | 27, 27, 9, 32 | 29, 29, 11, 32 |
| inter-B 3D expand layer A 424 | 128 | 3x3x3 | 1 | 29, 29, 11, 32 | 27, 27, 9, 128 |
| inter-B 3D expand layer B 425 | 128 | 1x1x1 | 1 | 27, 27, 9, 32 | 27, 27, 9, 128 |
| inter-B concat layer 426 | -- | -- | -- | 27, 27, 9, 128 27, 27, 9, 128 | 27, 27, 9, 256 |
| inter-B norm layer B 427 | -- | -- | -- | 27, 27, 9, 256 | 27, 27, 9, 256 |
| inter-B activation layer 428 | -- | -- | -- | 27, 27, 9, 256 | 27, 27, 9, 256 |
| inter-B combine layer 429 | -- | -- | -- | 27, 27, 9, 256 27, 27, 9, 256 | 27, 27, 9, 256 |

FIG. 5A

| Layer | Filters | Patch | Stride | Input Dimensions, Frames, Channels | Output Dimensions, Frames, Channels |
|---|---|---|---|---|---|
| intermediate layer group C 323 | | | | | |
| inter-C 3D squeeze layer 431 | 64 | 1x1x1 | 1 | 27, 27, 9, 256 | 27, 27, 9, 64 |
| inter-C norm layer A 432 | -- | -- | -- | 27, 27, 9, 64 | 27, 27, 9, 64 |
| inter-C 3D padding layer 433 | -- | -- | -- | 27, 27, 9, 64 | 29, 29, 11, 64 |
| inter-C 3D expand layer A 434 | 256 | 3x3x3 | 1 | 29, 29, 11, 64 | 27, 27, 9, 256 |
| inter-C 3D expand layer B 435 | 256 | 1x1x1 | 1 | 27, 27, 9, 64 | 27, 27, 9, 256 |
| inter-C concat layer 436 | -- | -- | -- | 27, 27, 9, 256<br>27, 27, 9, 256 | 27, 27, 9, 512 |
| inter-C norm layer B 437 | -- | -- | -- | 27, 27, 9, 512 | 27, 27, 9, 512 |
| inter-C activation layer 438 | -- | -- | -- | 27, 27, 9, 512 | 27, 27, 9, 512 |
| inter-C 3D bypass layer 430 | 512 | 1x1x1 | 1 | 27, 27, 9, 256 | 27, 27, 9, 512 |
| inter-C combine layer 439 | -- | -- | -- | 27, 27, 9, 512<br>27, 27, 9, 512 | 27, 27, 9, 512 |
| 3D downsampling layer A 331 | -- | 3x3x2 | 2 | 27, 27, 9, 512 | 13, 13, 4, 512 |
| intermediate layer group D 324 | | | | | |
| inter-D 3D squeeze layer 441 | 64 | 1x1x1 | 1 | 13, 13, 4, 512 | 13, 13, 4, 64 |
| inter-D norm layer A 442 | -- | -- | -- | 13, 13, 4, 64 | 13, 13, 4, 64 |
| inter-D 3D padding layer 443 | -- | -- | -- | 13, 13, 4, 64 | 15, 15, 6, 64 |
| inter-D 3D expand layer A 444 | 256 | 3x3x3 | 1 | 15, 15, 6, 64 | 13, 13, 4, 256 |
| inter-D 3D expand layer B 445 | 256 | 1x1x1 | 1 | 13, 13, 4, 64 | 13, 13, 4, 256 |
| inter-D concat layer 446 | -- | -- | -- | 13, 13, 4, 256<br>13, 13, 4, 256 | 13, 13, 4, 512 |
| inter-D norm layer B 447 | -- | -- | -- | 13, 13, 4, 512 | 13, 13, 4, 512 |
| inter-D activation layer 448 | -- | -- | -- | 13, 13, 4, 512 | 13, 13, 4, 512 |
| inter-D combine layer 449 | -- | -- | -- | 13, 13, 4, 512<br>13, 13, 4, 512 | 13, 13, 4, 512 |

FIG. 5B

| Layer | Filters | Patch | Stride | Input Dimensions, Frames, Channels | Output Dimensions, Frames, Channels |
|---|---|---|---|---|---|
| intermediate layer group E 325 | | | | | |
| inter-E 3D squeeze layer 451 | 96 | 1x1x1 | 1 | 13, 13, 4, 512 | 13, 13, 4, 96 |
| inter-E norm layer A 452 | -- | -- | -- | 13, 13, 4, 96 | 13, 13, 4, 96 |
| inter-E 3D padding layer 453 | -- | -- | -- | 13, 13, 4, 96 | 15, 15, 6, 96 |
| inter-E 3D expand layer A 454 | 384 | 3x3x3 | 1 | 15, 15, 6, 96 | 13, 13, 4, 384 |
| inter-E 3D expand layer B 455 | 384 | 1x1x1 | 1 | 13, 13, 4, 96 | 13, 13, 4, 384 |
| inter-E concat layer 456 | -- | -- | -- | 13, 13, 4, 384<br>13, 13, 4, 384 | 13, 13, 4, 768 |
| inter-E norm layer B 457 | -- | -- | -- | 13, 13, 4, 768 | 13, 13, 4, 768 |
| inter-E activation layer 458 | -- | -- | -- | 13, 13, 4, 768 | 13, 13, 4, 768 |
| inter-E 3D bypass layer 450 | 768 | 1x1x1 | 1 | 13, 13, 4, 512 | 13, 13, 4, 768 |
| inter-E combine layer 459 | -- | -- | -- | 13, 13, 4, 768<br>13, 13, 4, 768 | 13, 13, 4, 768 |
| intermediate layer group F 326 | | | | | |
| inter-F 3D squeeze layer 461 | 96 | 1x1x1 | 1 | 13, 13, 4, 768 | 13, 13, 4, 96 |
| inter-F norm layer A 462 | -- | -- | -- | 13, 13, 4, 96 | 13, 13, 4, 96 |
| inter-F 3D padding layer 463 | -- | -- | -- | 13, 13, 4, 96 | 15, 15, 6, 96 |
| inter-F 3D expand layer A 464 | 384 | 3x3x3 | 1 | 15, 15, 6, 96 | 13, 13, 4, 384 |
| inter-F 3D expand layer B 465 | 384 | 1x1x1 | 1 | 13, 13, 4, 96 | 13, 13, 4, 384 |
| inter-F concat layer 466 | -- | -- | -- | 13, 13, 4, 384<br>13, 13, 4, 384 | 13, 13, 4, 768 |
| inter-F norm layer B 467 | -- | -- | -- | 13, 13, 4, 768 | 13, 13, 4, 768 |
| inter-F activation layer 468 | -- | -- | -- | 13, 13, 4, 768 | 13, 13, 4, 768 |
| inter-F combine layer 469 | -- | -- | -- | 13, 13, 4, 768<br>13, 13, 4, 768 | 13, 13, 4, 768 |

FIG. 5C

| Layer | Filters | Patch | Stride | Input Dimensions, Frames, Channels | Output Dimensions, Frames, Channels |
|---|---|---|---|---|---|
| intermediate layer group G 327 | | | | | |
| inter-G 3D squeeze layer 471 | 128 | 1x1x1 | 1 | 13, 13, 4, 768 | 13, 13, 4, 128 |
| inter-G norm layer A 472 | -- | -- | -- | 13, 13, 4, 128 | 13, 13, 4, 128 |
| inter-G 3D padding layer 473 | -- | -- | -- | 13, 13, 4, 128 | 15, 15, 6, 128 |
| inter-G 3D expand layer A 474 | 512 | 3x3x3 | 1 | 15, 15, 6, 128 | 13, 13, 4, 512 |
| inter-G 3D expand layer B 475 | 512 | 1x1x1 | 1 | 13, 13, 4, 128 | 13, 13, 4, 512 |
| inter-G concat layer 476 | -- | -- | -- | 13, 13, 4, 512 13, 13, 4, 512 | 13, 13, 4, 1024 |
| inter-G norm layer B 477 | -- | -- | -- | 13, 13, 4, 1024 | 13, 13, 4, 1024 |
| inter-G activation layer 478 | -- | -- | -- | 13, 13, 4, 1024 | 13, 13, 4, 1024 |
| inter-G 3D bypass layer 470 | 1024 | 1x1x1 | 1 | 13, 13, 4, 768 | 13, 13, 4, 1024 |
| inter-G combine layer 479 | -- | -- | -- | 13, 13, 4, 1024 13, 13, 4, 1024 | 13, 13, 4, 1024 |
| | | | | | |
| 3D downsampling layer B 332 | -- | 3x3x2 | 2 | 13, 13, 4, 1024 | 6, 6, 2, 1024 |
| intermediate layer group H 328 | | | | | |
| inter-H 3D squeeze layer 481 | 128 | 1x1x1 | 1 | 6, 6, 2, 1024 | 6, 6, 2, 128 |
| inter-H norm layer A 482 | -- | -- | -- | 6, 6, 2, 128 | 6, 6, 2, 128 |
| inter-H 3D padding layer 483 | -- | -- | -- | 6, 6, 2, 128 | 8, 8, 4, 128 |
| inter-H 3D expand layer A 484 | 512 | 3x3x3 | 1 | 8, 8, 4, 128 | 6, 6, 2, 512 |
| inter-H 3D expand layer B 485 | 512 | 1x1x1 | 1 | 6, 6, 2, 128 | 6, 6, 2, 512 |
| inter-H concat layer 486 | -- | -- | -- | 6, 6, 2, 512 6, 6, 2, 512 | 6, 6, 2, 1024 |
| inter-H norm layer B 487 | -- | -- | -- | 6, 6, 2, 1024 | 6, 6, 2, 1024 |
| inter-H activation layer 488 | -- | -- | -- | 6, 6, 2, 1024 | 6, 6, 2, 1024 |
| inter-H combine layer 489 | -- | -- | -- | 6, 6, 2, 1024 6, 6, 2, 1024 | 6, 6, 2, 1024 |
| final layer group 340 | | | | | |
| final drop layer 491 | -- | -- | -- | 6, 6, 2, 1024 | 6, 6, 2, 1024 |
| final 3D convolution layer 492 | 1000 | 1x1x1 | 1 | 6, 6, 2, 1024 | 6, 6, 2, 1000 |
| final activation layer 493 | -- | -- | -- | 6, 6, 2, 1000 | 6, 6, 2, 1000 |
| final norm layer 494 | -- | -- | -- | 6, 6, 2, 1000 | 6, 6, 2, 1000 |
| final 3D downsample layer 495 | -- | 6x6x2 | 1 | 6, 6, 2, 1000 | 1, 1, 1, 1000 |
| final flatten layer 496 | -- | -- | -- | 1, 1, 1, 1000 | 1000 |

FIG. 5D

THREE-DIMENSIONAL CONVOLUTIONAL NEURAL NETWORKS FOR VIDEO HIGHLIGHT DETECTION

FIELD

This disclosure relates to three-dimensional convolutional neural networks for video highlight detection.

BACKGROUND

Convolutional neural networks may be used to process images. For example, convolutional neural networks may be used for image recognition and/or image classification.

SUMMARY

This disclosure relates to three-dimensional convolutional neural networks for video highlight detection. A three-dimensional convolutional neural network may include a preliminary layer group, one or more intermediate layer groups, a final layer group, and/or other layers/layer groups. The preliminary layer group may include an input layer, a preliminary three-dimensional padding layer, a preliminary three-dimensional convolution layer, a preliminary activation layer, a preliminary normalization layer, and a preliminary downsampling layer. One or more intermediate layer groups may include an intermediate three-dimensional squeeze layer, a first intermediate normalization layer, an intermediate three-dimensional padding layer, a first intermediate three-dimensional expand layer, a second intermediate three-dimensional expand layer, an intermediate concatenation layer, a second intermediate normalization layer, an intermediate activation layer, and an intermediate combination layer. The final layer group may include a final dropout layer, a final three-dimensional convolution layer, a final activation layer, a final normalization layer, a final three-dimensional downsampling layer, and a final flatten layer.

A three-dimensional convolutional neural network system may include one or more physical processors, and/or other components. The one or more physical processors may be configured by machine-readable instructions. Executing the machine-readable instructions may cause the one or more physical processors to facilitate uses of a three-dimensional convolutional neural network for video highlight detection. The machine-readable instructions may include one or more computer program components. The computer program components may include one or more of an access component, a segment component, an input component, a preliminary layer group component, an intermediate layer group component, a downsampling layer component, a final layer group component, a LSTM component, a highlight component, and/or other computer program components. In some implementations, the computer program components may include a categorization component.

The access component may be configured to access video content. The video content may have a duration. Video content may have been captured by one or more image sensors. Video content may have been captured at a time or at different times. Video content may have been captured at one or more real world locations. Video content may include one or more of an image, a sequence of images, a frame of a video, a video, and/or other video content.

The segment component may be configured to segment the video content into one or more sets of video segments. Individual video segments within a set of video segments may include the same number of video frames. The segment component may segment the video content into a first set of video segments and/or other sets of video segments. In some implementations, individual video segments within the first set of video segments may include sixteen video frames. The first set of video segments may comprise a first video segment, a second video segment, and/or other video segments. The second video segment may follow the first video segment within the duration. In some implementations, the segment component may segment the video content into a second set of video segments. Individual video segments within the second set of video segments may include different numbers of video frames than the individual video segments within the first set of video segments.

One or more three-dimensional convolutional neural network may be used for highlight detection within video content. In some implementations, the three-dimensional convolutional neural network may be initialized with pre-trained weights from a trained two-dimensional convolutional neural network. The pre-trained weights from the trained two-dimensional convolutional neural network may be stacked along a time dimension. A three-dimensional convolutional neural network may include one or more sequences of layers. The three-dimensional convolutional neural network may include one or more of a preliminary layer group, an intermediate layer group, a final layer group, downsampling layers, and/or other layers/layer groups.

The input component may be configured to input one or more sets of video segments into a first three-dimensional convolutional neural network. The first three-dimensional convolutional neural network may output one or more sets of spatiotemporal feature vectors corresponding to one or more sets of video segments. The input component may input the first set of video segments into the first three-dimensional convolutional network. The first three-dimensional convolutional neural network may output a first set of spatiotemporal feature vectors corresponding to the first set of video segments.

In some implementations, the input component may input the second set of video segments into a second three-dimensional convolutional network. The second three-dimensional convolutional neural network may output a second set of spatiotemporal feature vectors corresponding to the second set of video segments.

The preliminary layer group component may be configured to effectuate operation of a preliminary layer group and/or other layers/layer groups. The preliminary layer group may include one or more of an input layer, a preliminary three-dimensional padding layer, a preliminary three-dimensional convolution layer, a preliminary activation layer, a preliminary normalization layer, a preliminary three-dimensional downsampling layer, and/or other layers.

The input layer may, for the individual video segments, access a video segment map. The video segment map may be characterized by a height dimension, a width dimension, a number of video frames, a number of channels, and/or other parameters. The preliminary three-dimensional padding layer may increase the dimensionality of the video segment map. The preliminary three-dimensional convolution layer may convolve the video segment map to produce a first set of feature maps. The preliminary activation layer may apply a first activating function to the first set of feature maps. The preliminary normalization layer may normalize the first set of feature maps. The preliminary three-dimensional downsampling layer may downsample the first set of feature maps. In some implementations, the first set of feature maps may be downsampled using a max pooling and/or other downsampling methods.

The intermediate layer group component may be configured to effectuate operation of one or more intermediate layer groups and/or other layers/layer groups. One or more intermediate layer groups may include one or more of an intermediate three-dimensional squeeze layer, a first intermediate normalization layer, an intermediate three-dimensional padding layer, a first intermediate three-dimensional expand layer, a second intermediate three-dimensional expand layer, an intermediate concatenation layer, a second intermediate normalization layer, an intermediate activation layer, an intermediate combination layer, and/or other layers.

In some implementations, one or more intermediate layer groups may include a first intermediate layer group, a second intermediate layer group, a third intermediate layer group, a fourth intermediate layer group, a fifth intermediate layer group, a sixth intermediate layer group, a seventh intermediate layer group, and an eighth intermediate layer group, and/or other layers/layer groups.

The intermediate three-dimensional squeeze layer may receive a first output from a layer preceding the individual intermediate layer group. The intermediate three-dimensional squeeze layer may convolve the first output to reduce a number of channels of the first output. The first intermediate normalization layer may normalize the first output. The intermediate three-dimensional padding layer may increase the dimensionality of the first output. The first intermediate three-dimensional expand layer may convolve the first output to produce a second set of feature maps. The second intermediate three-dimensional expand layer may convolve the first output to produce a third set of feature maps.

The intermediate concatenation layer may concatenate the second set of feature maps and the third set of feature maps to produce a set of concatenated feature maps. The second intermediate normalization layer may normalize the set of concatenated feature maps. The intermediate activation layer may apply a second activating function to the set of concatenated feature maps. The intermediate combination layer may combines the set of concatenated feature maps and the first output. In some implementations, one or more intermediate layer groups may include an intermediate three-dimensional bypass layer. The intermediate three-dimensional bypass layer may convolve the first output to match the dimensionality of the first output to the dimensionality of the set of concatenated feature maps. In some implementations, one or more intermediate layer groups may not include an activation layer that applies an activating function to the first output between the first intermediate normalization layer and the intermediate padding layer.

The downsampling layer component may be configured to effectuate operation of one or more downsampling layers and/or other layers/layer groups. One or more downsampling layers may include one or more three-dimensional downsampling layers between two intermediate layer groups, and/or other layers.

A first three-dimensional downsampling layer may be located between the third intermediate layer group and the fourth intermediate layer group. The first three-dimensional downsampling layer may receive a third output from the third intermediate layer group and downsample the third output. In some implementations, the third output may be downsampled using a max pooling and/or other downsampling methods.

In some implementations, a second three-dimensional downsampling layer may be located between the seventh intermediate layer group and the eighth intermediate layer group. The second three-dimensional downsampling layer may receive a fourth output from the seventh intermediate layer group and downsample the fourth output. In some implementations, the fourth output may be downsampled using a max pooling and/or other downsampling methods.

The final layer group component may be configured to effectuate operation of a final layer group and/or other layers/layer groups. The final layer group may include one or more of a final dropout layer, a final three-dimensional convolution layer, a final activation layer, a final normalization layer, a final three-dimensional downsampling layer, a final flatten layer, and/or other layers.

The final dropout layer may receive a second output from a layer preceding the final layer group. The final dropout layer may reduce an overfitting from the second output. The final three-dimensional convolution layer may convolve the second output to produce a fourth set of feature maps. The final activation layer may apply a third activating function to the fourth set of feature maps. The final normalization layer may normalize the fourth set of feature maps. The final three-dimensional downsampling layer may downsample the fourth set of feature maps. In some implementations, the fourth set of feature maps may be downsampled using an average pooling and/or other downsampling methods. The final flatten layer may convert the fourth set of feature maps into a spatiotemporal feature vector.

The LSTM component may be configured to input one or more sets of spatiotemporal feature vectors into a long short-term memory network. The long short-term memory network may be trained with second video content including highlights and/or other information. The long short-term memory network may determine one or more sets of predicted spatiotemporal feature vectors based on the one or more sets of spatiotemporal feature vectors and/or other information. The LSTM component may input the first set of spatiotemporal feature vectors into the long short-term memory network. The long short-term memory network may determine a first set of predicted spatiotemporal feature vectors based on the first set of spatiotemporal feature vectors, and/or other information.

In some implementations, the LSTM component may input the second set of spatiotemporal feature vectors into the long short-term memory network. The long short-term memory network may determine a second set of predicted spatiotemporal feature vectors based on the second set of spatiotemporal feature vectors, and/or other information.

In some implementations, individual predicted spatiotemporal feature vectors corresponding to the individual video segments may characterize a prediction of a video segment following the individual video segments within the duration. In some implementations, individual predicted spatiotemporal feature vectors for the individual video segments may characterize a prediction of a video segment preceding the individual video segments within the duration.

In some implementations, the first set of spatiotemporal feature vectors may include a first spatiotemporal feature vector corresponding to the first video segment and a second spatiotemporal feature vector corresponding to the second video segment. The first set of predicted spatiotemporal feature vectors may include a first predicted spatiotemporal feature vector determined based on the first spatiotemporal feature vector. The first predicted spatiotemporal feature vector may characterize a prediction of the second video segment.

The highlight component may be configured to determine a presence of one or more highlight moments within the video content based on a comparison of one or more spatiotemporal feature vectors with one or more predicted spatiotemporal feature vectors, and/or other information. The highlight component may determine a presence of one or more highlight moments within the video content based on a comparison of one or more of the first set of spatiotemporal feature vectors with one or more predicted spatiotemporal feature vectors of the first set of predicted spatiotemporal feature vectors, and/or other information. In some implementations, the highlight component may determine a presence of one or more highlight moments within the video content further based on a comparison of one or more of the second set of spatiotemporal feature vectors with one or more predicted spatiotemporal feature vectors of the second set of predicted spatiotemporal feature vectors, and/or other information.

In some implementations, the presence of one or more highlight moments within the video content may be determined based on a difference between the one or more spatiotemporal feature vectors of the first set of spatiotemporal feature vectors and the one or more predicted spatiotemporal feature vectors of the first set of predicted spatiotemporal feature vectors meeting or being below a threshold.

In some implementations, the comparison of the one or more spatiotemporal feature vectors of the first set of spatiotemporal feature vectors with the one or more predicted spatiotemporal feature vectors of the first set of predicted spatiotemporal feature vectors may include a comparison of the second spatiotemporal feature vector with the first predicted spatiotemporal feature vector.

The categorization component may be configured to input two or more spatiotemporal feature vectors into a categorization layer. The categorization layer may determine a category for the video content based on two or more spatiotemporal feature vectors. The categorization layer may determine a category for the video content based on two or more spatiotemporal feature vectors of the first set of spatiotemporal feature vectors.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 5A-5D illustrate exemplary parameters for layers shown in FIGS. 4A-4I.

DETAILED DESCRIPTION

Figure 1:
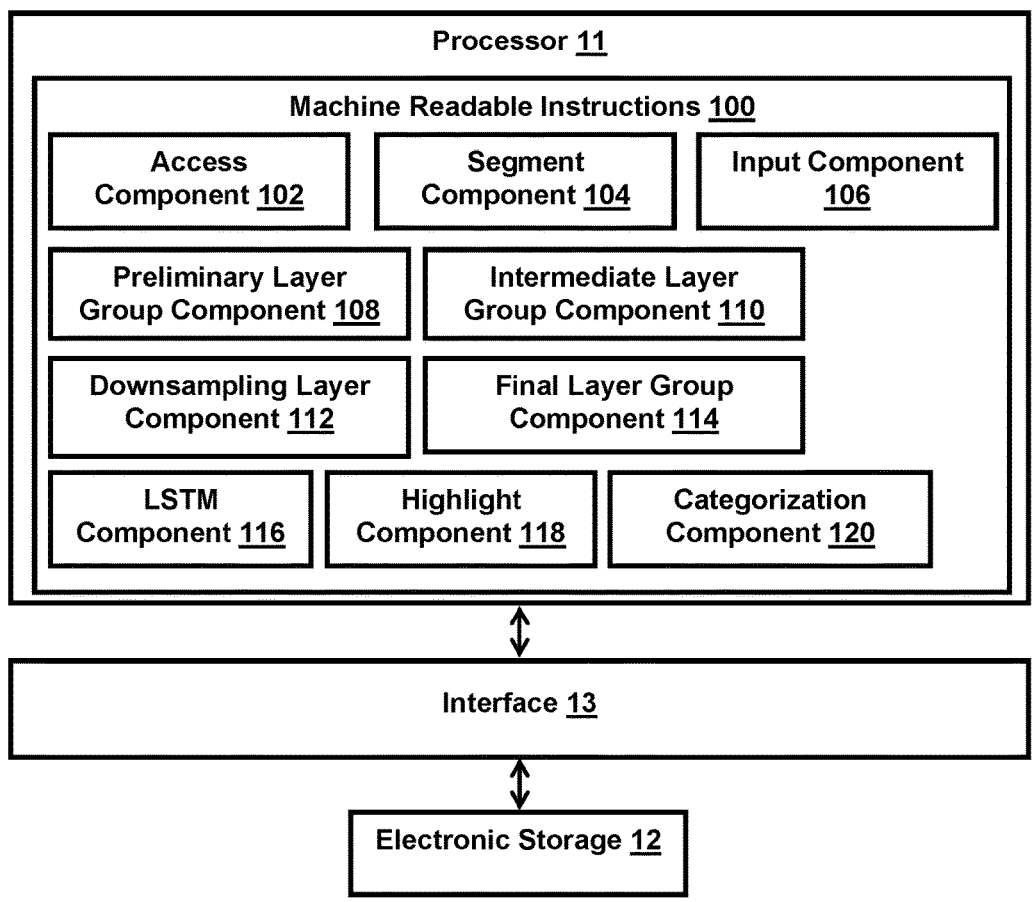
FIG. 1 illustrates a three-dimensional convolutional neural network system for video highlight detection.

FIG. 1 illustrates system 10 for three-dimensional convolutional neural networks. System 10 may include one or more of processor 11, electronic storage 12, interface 13 (e.g., bus, wireless interface), and/or other components. A three-dimensional convolutional neural network may include a preliminary layer group, one or more intermediate layer groups, a final layer group, and/or other layers/layer groups. The preliminary layer group may include an input layer, a preliminary three-dimensional padding layer, a preliminary three-dimensional convolution layer, a preliminary activation layer, a preliminary normalization layer, and a preliminary downsampling layer. One or more intermediate layer groups may include an intermediate three-dimensional squeeze layer, a first intermediate normalization layer, an intermediate three-dimensional padding layer, a first intermediate three-dimensional expand layer, a second intermediate three-dimensional expand layer, an intermediate concatenation layer, a second intermediate normalization layer, an intermediate activation layer, and an intermediate combination layer. The final layer group may include a final dropout layer, a final three-dimensional convolution layer, a final activation layer, a final normalization layer, a final three-dimensional downsampling layer, and a final flatten layer.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to video content, video frames, video segments, video segment maps, highlight moments, video categories, layers, layer groups, filters, training convolutional neural networks, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate uses of three-dimensional convolutional neural networks for video highlight detection. Machine-readable instructions 100 may include one or more computer program components. Machine readable instructions 100 may include one or more of access component 102, segment component 104, input component 106, preliminary layer group component 108, intermediate layer group component 110, downsampling layer component 112, final layer group component 114, LSTM component 116, highlight component 118, and/or other computer program components. In some implementations, the computer program components may include categorization component 120.

Access component 102 may be configured to access video content. The video content may have a duration. Video content may have been captured by one or more image sensors. Video content may have been captured at a time or at different times. Video content may have been captured at one or more real world locations. Video content may include one or more of an image, a sequence of images, a frame of a video, a video, and/or other video content.

Access component 102 may access one or more video content from one or more storage locations. A storage location may include electronic storage 12, electronic storage of one or more image sensors (not shown in FIG. 1), and/or other locations. Access component 102 may be configured to access one or more video content during acquisition of the video content and/or after acquisition of the video content by one or more image sensors. For example, access component 102 may access video content while the video content is being captured by one or more image sensors. Access component 102 may access video content after the video content has been captured and stored in memory (e.g., electronic storage 13).

Figure 6:
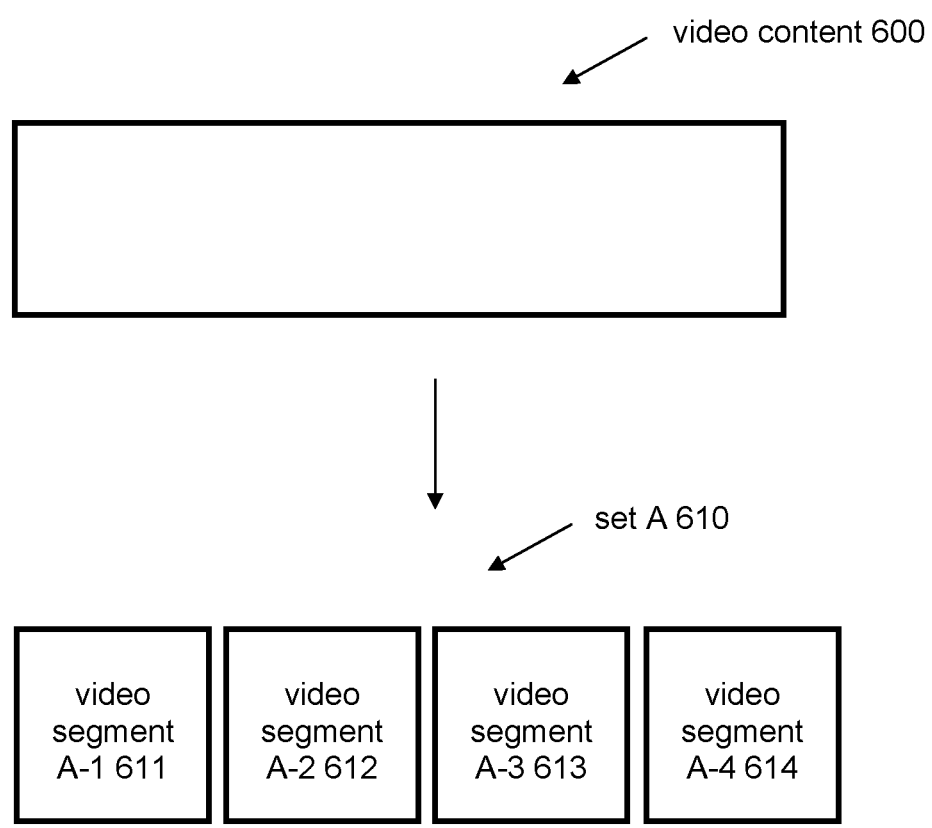
FIG. 6 illustrates exemplary segmentation of video content.

Segment component 104 may be configured to segment the video content into one or more sets of video segments. Individual video segments within a set of video segments may include the same number of video frames. Segment component 104 may segment the video content into a first set of video segments and/or other sets of video segments. The first set of video segments may comprise a first video segment, a second video segment, and/or other video segments. The second video segment may follow the first video segment within the duration. For example, FIG. 6 illustrates exemplary segmentation of video content 600. Segment component 104 may segment video content 600 into set A 610 and/or other sets of video segments. Set A 610 may include video segment A-1 611, video segment A-2 612, video segment A-3 613, video segment A-4 614, and/or other video segments. Video segment A-2 612 may follow video segment A-1 611. Video segment A-3 613 may follow video segment A-2 612. Video segment A-4 614 may follow video segment A-3 613. Individual video segments within set A 610 may include the same number of video frames.

In some implementations, individual video segments within the first set of video segments may include sixteen video frames. For example, video content 600 may have been captured at a rate of thirty-two video frames per second and sixteen video frames may correspond to a video duration of 0.5 second. In some implementations, segment component 104 may speed up or slow down the video content for video segmentation. For example, segment component 104 may speed up video content 600 by a factor of four and sixteen video frames may correspond to a video duration of 2 seconds. Other capture rates and numbers of video frames within video segments are contemplated.

In some implementations, segment component 104 may segment the video content into a second set of video segments. Individual video segments within the second set of video segments may include different numbers of video frames than the individual video segments within the first set of video segments. Individual video segments within the second set of video segments may include fewer or greater numbers of video frames than the individual video segments within the first set of video segments. For example, individual video segments within the first set of video segments may include sixteen video frames and individual video segments within the second set of video segments may include twenty-four video frames. Other numbers of video frames are contemplated.

One or more three-dimensional convolutional neural networks may be used for highlight detection within video content. A three-dimensional convolutional neural network may include one or more three-dimensional layers that preserves temporal information of the inputs into the three-dimensional convolutional neural networks. Exemplary parameters for different layers within the three-dimensional convolutional neural network are shown in FIG. 5A-5D. For simplicity, the value of dimension corresponding to the color channel (e.g., 3) for patches are not shown in FIGS. 5A-5D. Other parameters for different layers within the three-dimensional convolutional neural network are contemplated.

A three-dimensional convolutional neural network may include filters that are self-optimized through learning for classification of faces within images. Different three-dimensional convolutional neural network may be trained for video highlight detection using video segments of different numbers of video frames. For example, a first three-dimensional convolutional neural network may be trained for video highlight detection using video segments of sixteen video frames. A second three-dimensional convolutional neural network may be trained for video highlight detection using video segments of twenty-four video frames. Training of three-dimensional convolutional neural network for video highlight detection using video segments of other numbers of video frames are contemplated.

In some implementations, the three-dimensional convolutional neural network may be initialized with pre-trained weights from a trained two-dimensional convolutional neural network. A two-dimensional convolutional neural network may have a structure similar to the three-dimensional convolutional neural network and include two-dimensional layers rather than three-dimensional layers. The two-dimensional convolutional neural network may be trained with one or more image dataset (e.g., ImageNet). The pre-trained weights from the trained two-dimensional convolutional neural network may be prepared for the three-dimensional convolutional neural network via a scheme in which a stack of two-dimensional weights form pre-trained three-dimensional cube weights per layer. The pre-trained weights from the trained two-dimensional convolutional neural network may be stacked along a time dimension. Stacking pre-trained weights along a time dimension may create a four-dimensional tensor from three-dimensional tensors.

For example, weight dimensions of first convolution layer within the two-dimensional convolutional neural network may be 7×7. The weight dimension may also include a dimension for color (e.g., 3). Two pre-trained weights from the two-dimensional convolutional neural network may be stacked along the time dimension to form 7×7×2 weights for initializing first three-dimensional convolution layer within the three-dimensional convolutional neural network. Initializing the three-dimensional convolutional neural network with pre-trained weights from the trained two-dimensional convolutional neural network may provide the three-dimensional convolutional neural network with a spatial content and facilitate training of the three-dimensional convolutional neural network.

The three-dimensional convolutional neural network may be trained with one or more data sets. For example, the three-dimensional convolutional neural network may be trained with Sports1M data set. Compared to training with C3D data set, training with Sports1M data set may decrease the performance of the three-dimensional convolutional neural network by a factor of about two while compressing the size of the three-dimensional convolutional neural network by a factor of about twenty-five.

Input component 106 may be configured to input one or more sets of video segments (e.g., the first set of video segments, the second set of video segments) into one or more/different three-dimensional convolutional neural networks. The three-dimensional convolutional neural network may output one or more sets of spatiotemporal feature vectors corresponding to one or more sets of video segments (e.g., a first set of spatiotemporal feature vectors corresponding to the first set of video segments, a second set of spatiotemporal feature vectors corresponding to the second set of video segments). For example, input component 106 may input set A 610 into the first three dimensional convolutional neural network. The first three-dimensional convolutional neural network may output a set of spatiotemporal feature vectors corresponding to input set A 610.

Figure 3:
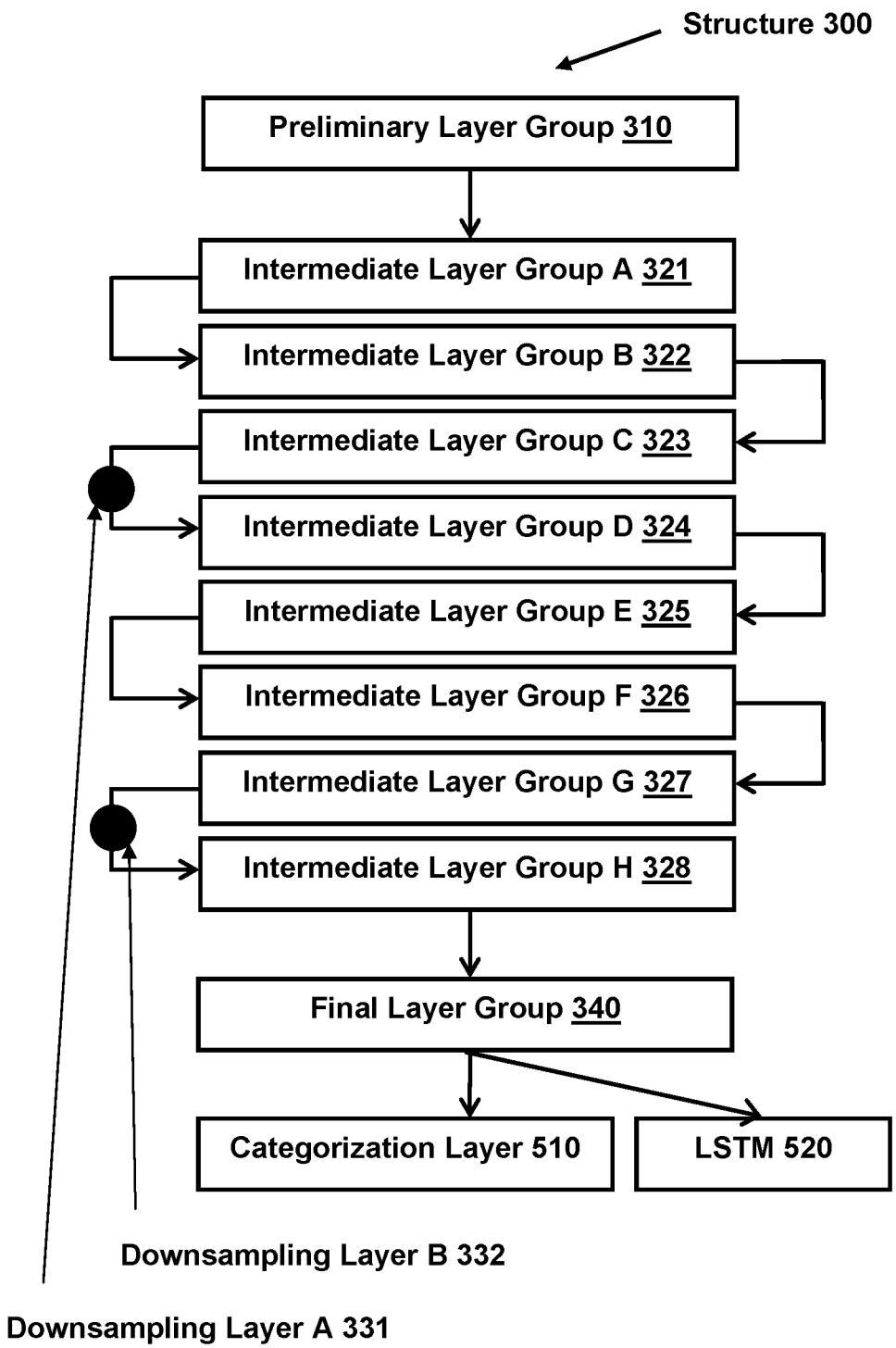
FIG. 3 illustrates an exemplary three-dimensional convolutional neural network structure for video highlight detection.
Figure 4A:
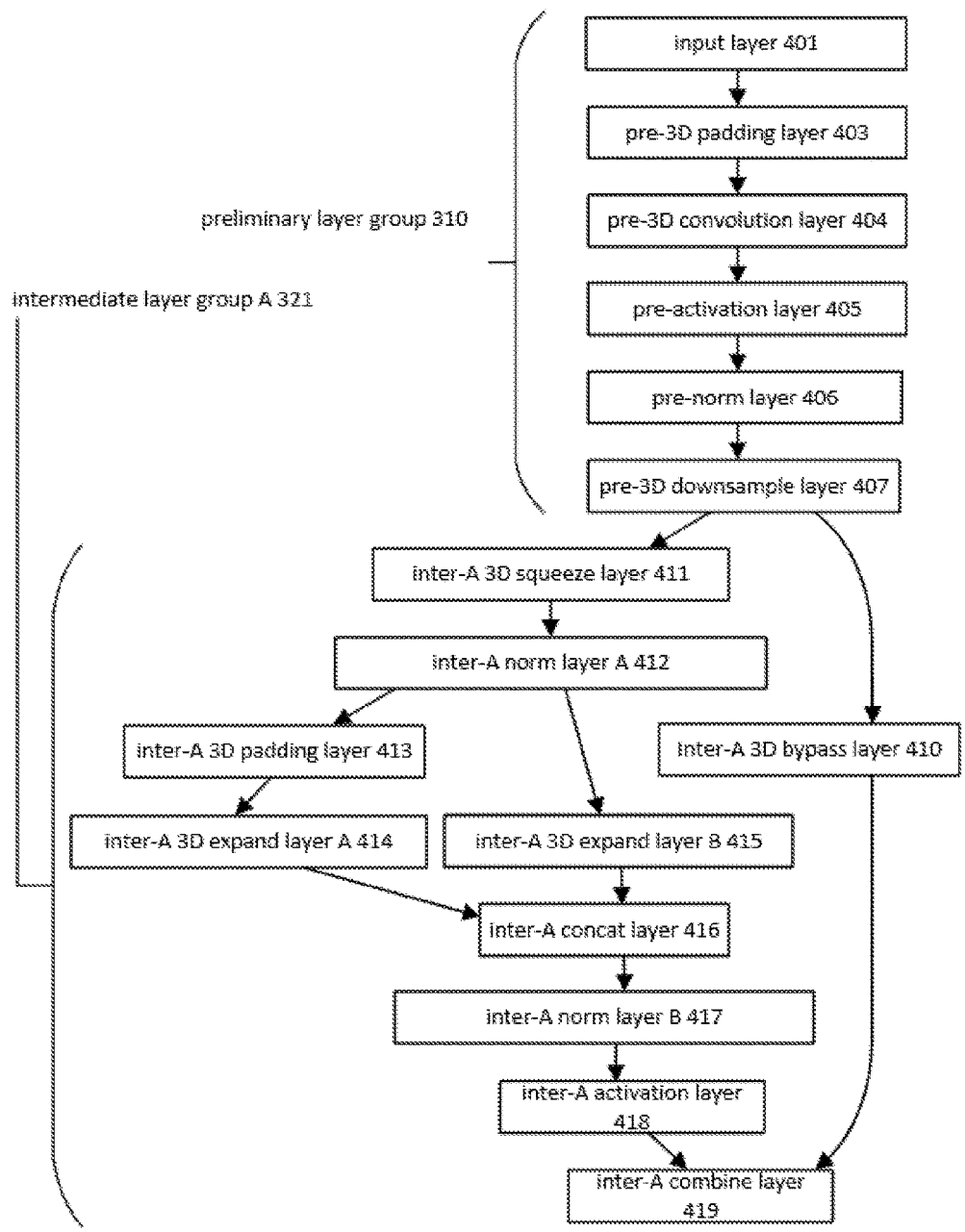
FIGS. 4A-4I illustrate exemplary layers within three-dimensional convolutional neural network structure of FIG. 3.
Figure 4B:
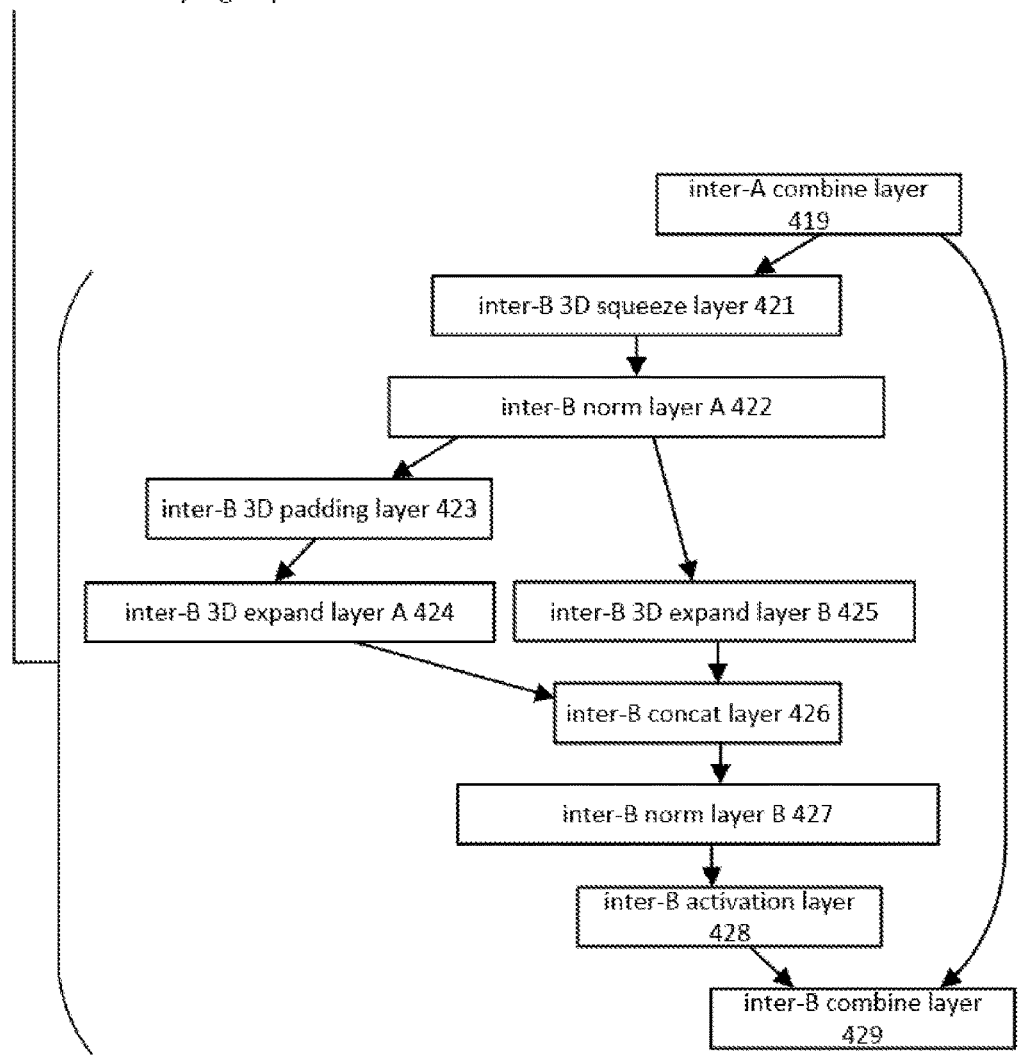
Figure 4C:
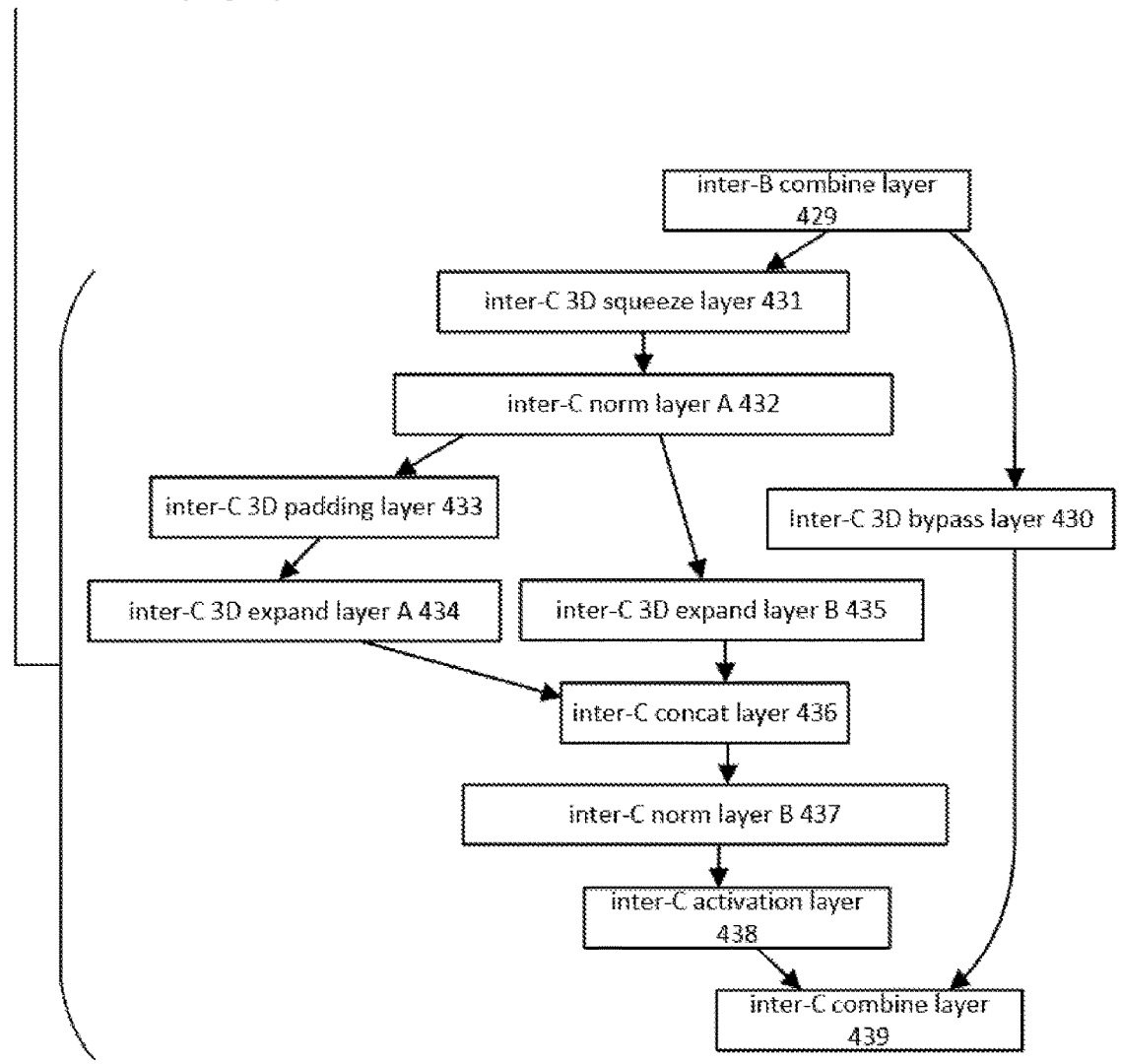
Figure 4D:
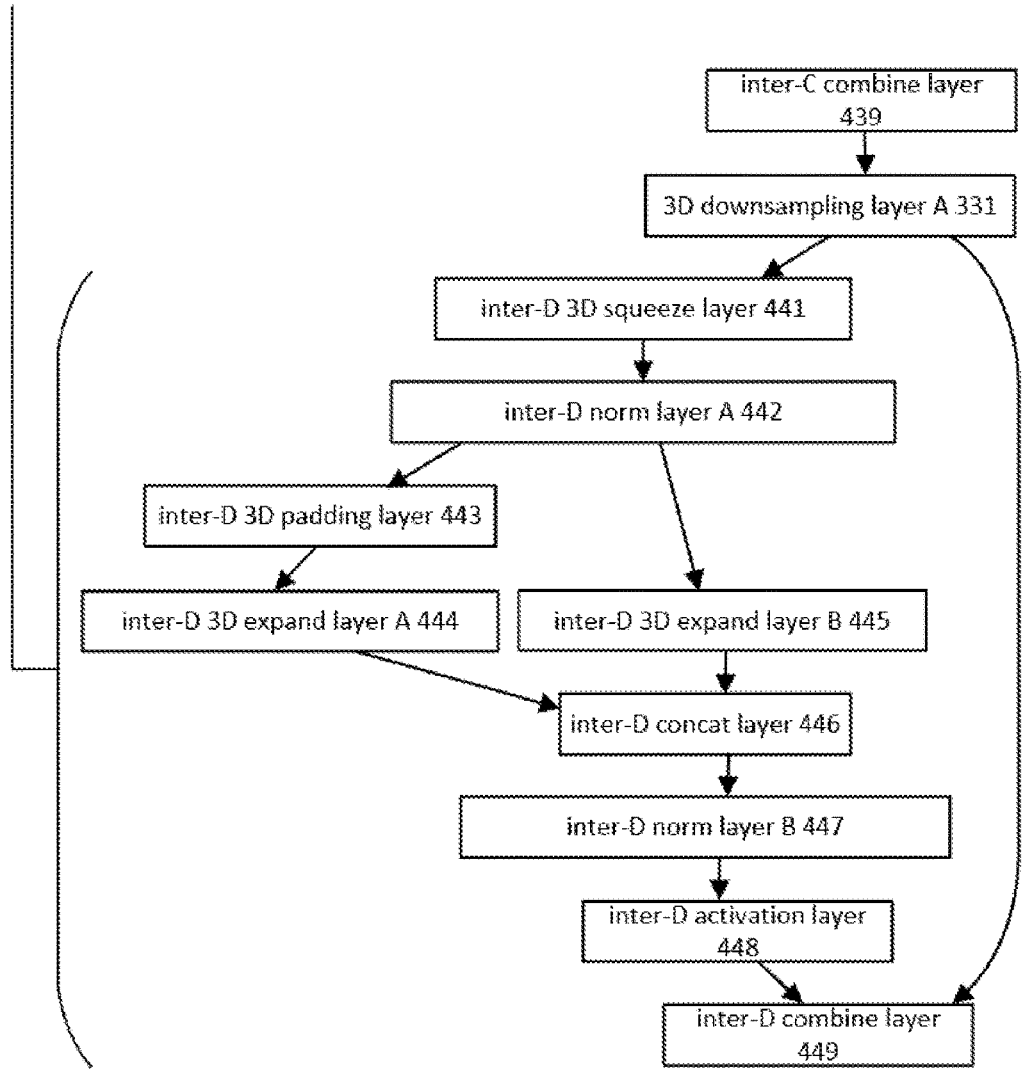
Figure 4E:
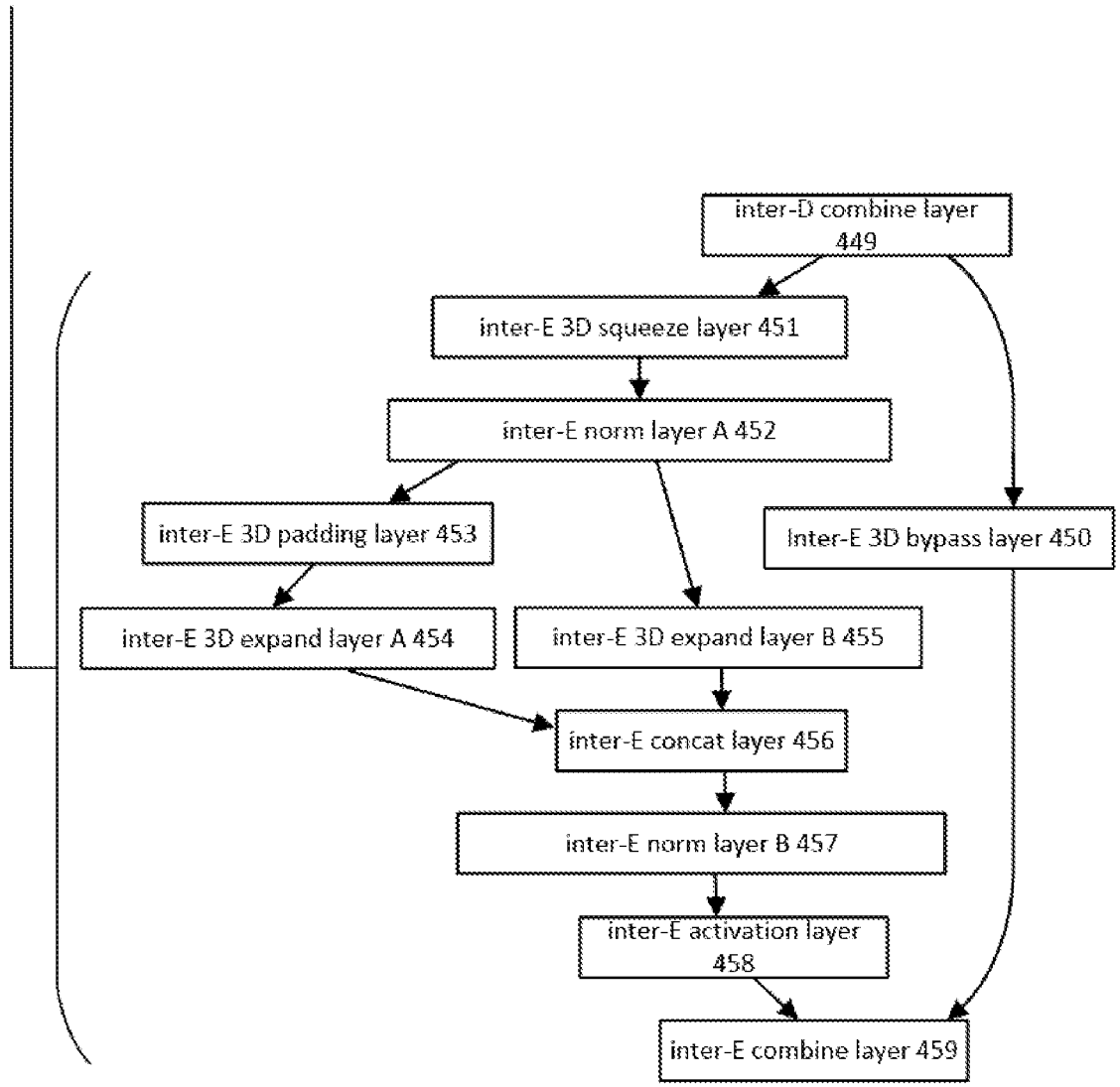
Figure 4F:
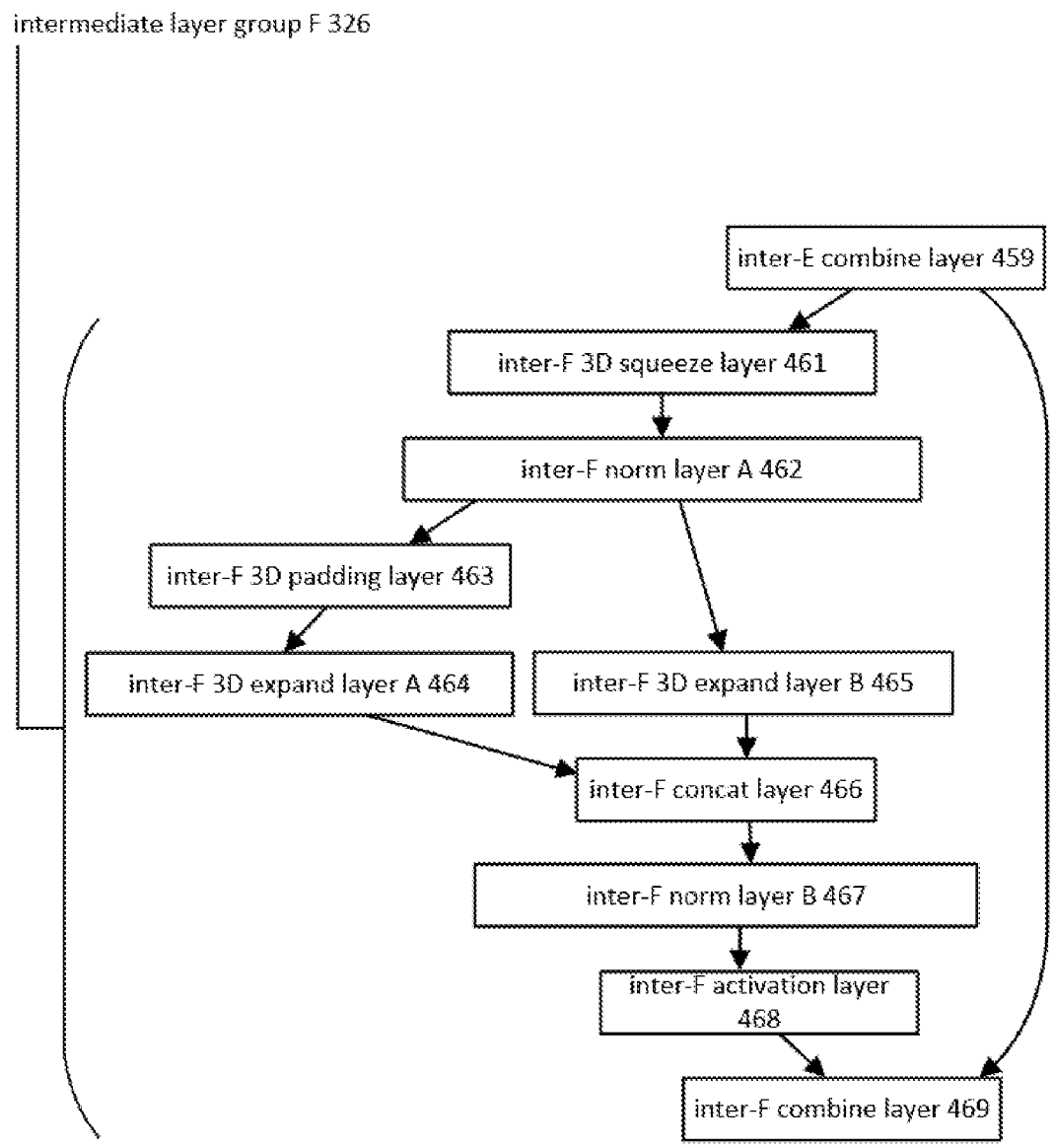
Figure 4G:
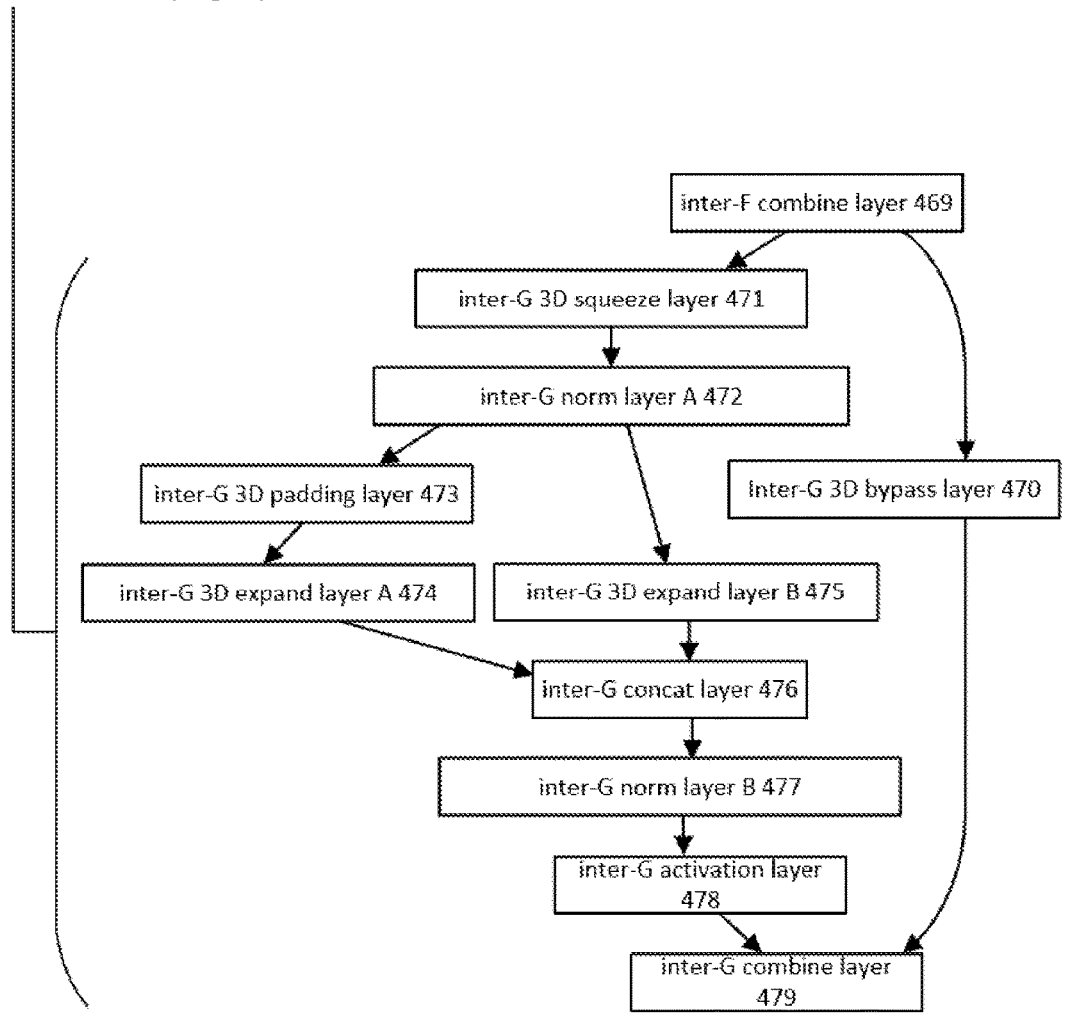
Figure 4H:
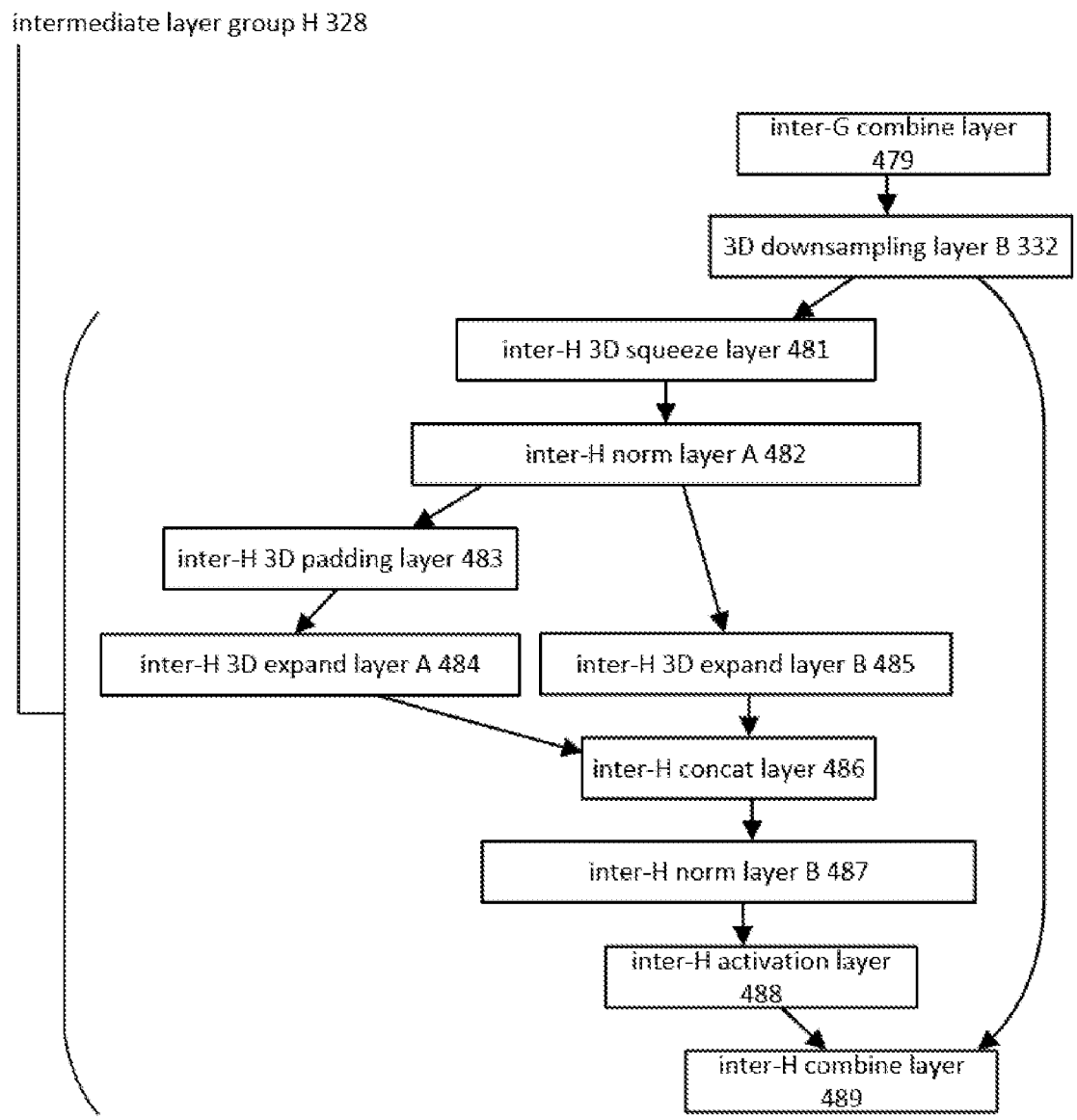
Figure 4I:
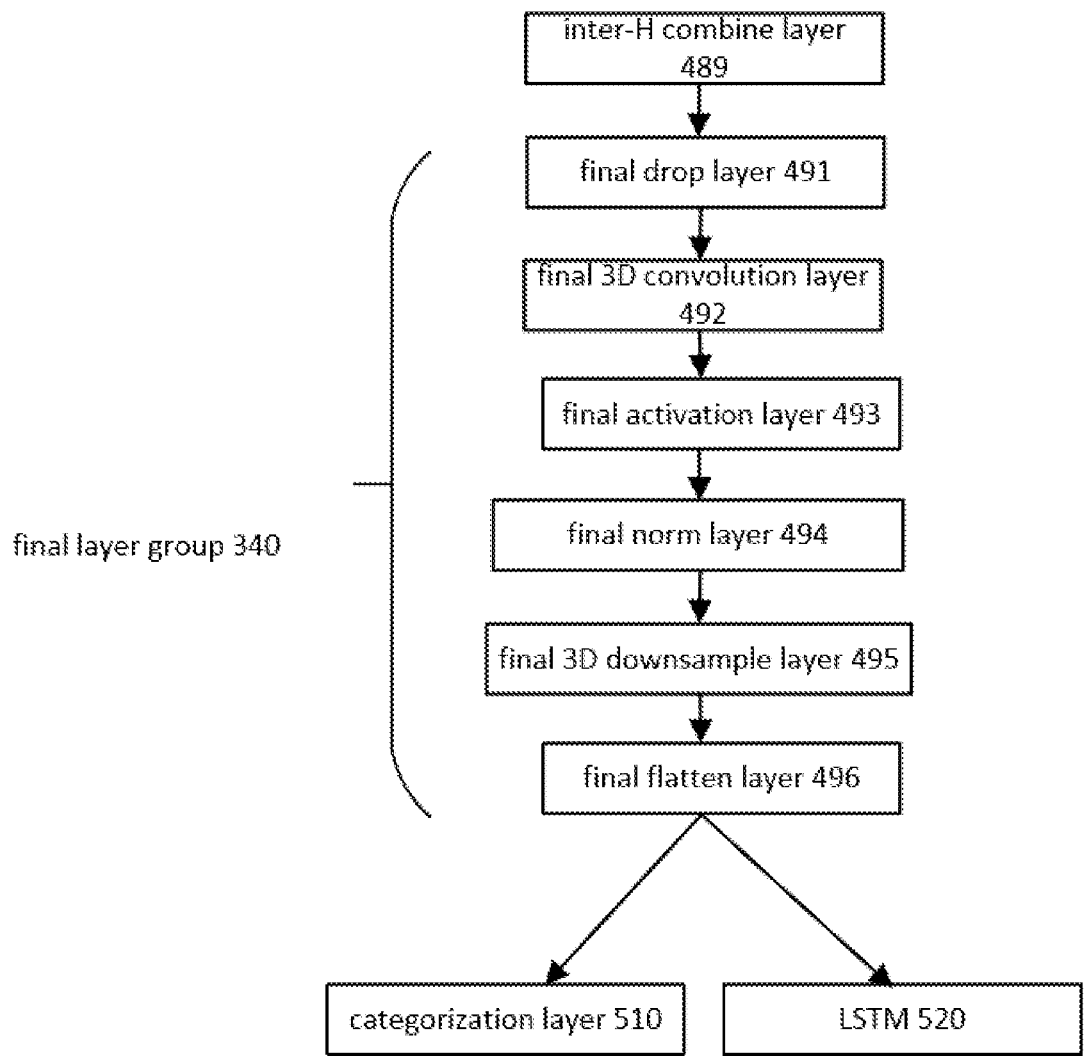

The three-dimensional convolutional neural network may include one or more sequences of layers and/or layer groups. Individual layers/layer groups may perform one or more functions, receiving an input and producing an output. The three-dimensional convolutional neural network may include one or more of a preliminary layer group, an intermediate layer group, a final layer group, downsampling layers, and/or other layers/layer groups. FIG. 3 illustrates an exemplary structure 300 for a three-dimensional convolutional neural network. Structure 300 may include preliminary layer group 310, intermediate layer group A 321, intermediate layer group B 322, intermediate layer group C 323, intermediate layer group D 324, intermediate layer group E 325, intermediate layer group F 326, intermediate layer group G 327, intermediate layer group H 328, final layer group 340, downsampling layer A 331, downsampling layer B 332, and/or other layers/layer groups.

FIGS. 4A-4I illustrate exemplary sequence of layers within structure 300 of FIG. 3. Sequence of layers within structure 300 may include one or more layers between the depicted layers. For example, sequence of layers within structure 300 may include one or more additional layers (not shown) between the depicted layers. For example, structure 300 may include one or more additional layers between layers of a layer group (e.g., preliminary layer group, intermediate layer group, final layer group,) and/or one or more additional layers between layer groups.

Preliminary layer group component 108 may be configured to effectuate operation of preliminary layer group 310 and/or other layers/layer groups. Preliminary layer group 310 may include one or more of an input layer, a preliminary three-dimensional padding layer, a preliminary three-dimensional convolution layer, a preliminary activation layer, a preliminary normalization layer, a preliminary three-dimensional downsampling layer, and/or other layers. For example, preliminary layer group 310 may include input layer 401, pre-3D padding layer 403, pre-3D convolution layer 404, pre-activation layer 405, pre-norm layer 406, pre-3D downsample layer 407, and/or other layers.

Input layer 401 may access one or more video segment maps and/or other information as input to the three-dimensional convolutional neural network. Input layer 401 may access one or more video segment maps and/or other information stored in electronic storage 12 and/or in other locations. Accessing multiple video segment maps at the same time may allow for batch training of the three-dimensional convolutional neural network. Batch training may allow for faster training and/or prediction by the three-dimensional convolutional neural network. Input layer 401 may, for the individual video segments, access a video segment map and/or other information.

A video segment map may be characterized by a height dimension, a width dimension, a number of video frames, a number of channels (e.g., number of color channels, number of feature maps), and/or other parameters. For example, input layer 401 may receive as input to the three-dimensional convolutional neural network one or more video segment maps characterized by a height of 112 pixels, and a width of 112 pixels, 16 video frames, and 3 channels of color. The number of channels and/or dimensions of an input into the three-dimensional convolutional neural network may change as the input is processed through layers/layer groups. Exemplary numbers of dimensions, frames, and channels for inputs to and outputs of individual layers of structure 300 are shown in FIGS. 5A-5D.

Pre-3D padding layer 403 may increase the dimensionality of one or more video segment maps. Pre-3D padding layer 403 may increase the dimensionality using one or more zero-padding transforms and/or other transforms. Pre-3D padding layer 403 may increase the dimensionality one or more video segment maps to produce one or more padded video segment maps. For example, pre-3D padding layer 403 may increase the dimensionality of one or more video segment maps (e.g., from 112×112×16 to 118×118×20) by padding the borders of the video segment maps with zero values. Padding the borders of the video segment maps with zero values may allow for the three-dimensional convolutional neural network to control the dimensions of outputs of convolution operations (e.g., feature maps).

Pre-3D convolution layer 404 may convolve one or more video segment maps to produce one or more sets of feature maps. Pre-3D convolution layer 404 may convolve one or more video segment maps padded by pre-3D padding layer 403. Pre-3D convolution layer 404 may include one or more filters. One or more filters may slide over the video segment maps to output the sets of feature maps based on scalar products of the video segment maps and the filters. The number of feature maps outputted by pre-3D convolution layer 404 may be equal to the number of filters of pre-3D convolution layer 404. For example, pre-3D convolution layer 404 may include 96 filters and may output 96 feature maps (the output has 96 channels). Outputs from a convolution operation may have a smaller dimensionality than inputs to the convolution operation. The reduction in dimensionality may be based on the dimensionality and stride of filters of pre-3D convolution layer 404. For example, pre-3D convolution layer 404 may include filters with dimension of 7×7×2, and may convolve the maps using a stride of 2 (shifting filters by two pixels at each step). Pre-3D convolution layer 404 may receive video segment maps with dimensions of 118×118×20 and output feature maps with dimensions of 56×56×19.

Pre-activation layer 405 may apply an activating function to one or more sets of feature maps. Pre-activation layer 405 may apply an activating function to one more sets of feature maps from pre-3D convolution layer 404 to produce one or more sets of activated feature maps. An activating function may include a non-saturating activating function that increases the nonlinear properties of the decision function. In some implementations, pre-activation layer 405 may include a ReLU (Rectified Linear Unit) and/or other activating functions.

Pre-norm layer 406 may normalize one or more sets of feature maps. Pre-norm layer 406 may normalize one or more sets of activated feature maps from pre-activation layer 405 to produce one or more normalized sets of activated feature maps. Pre-norm layer 406 may perform normalization using one or more batch normalizing transforms and/or other transforms. Pre-norm layer 406 may normalize scalar features of one or more sets of feature maps to produce one or more normalized sets of activated feature maps. The normalized sets of activated feature maps may be characterized by mean of zero and variance of one. Normalizing the sets of activated feature maps may increase the accuracy, training speed, and/or learning rate of the three-dimensional convolutional neural network.

Pre-3D downsample layer 407 may downsample one or more sets of feature maps. Pre-3D downsample layer 407 may downsample one or more normalized sets of activated feature maps from pre-norm layer 406 to produce one or more downsampled sets of activated feature maps. Pre-3D downsample layer 407 may perform downsampling using a max pooling and/or other downsampling methods.

Downsampling feature maps may reduce the dimensionality of the feature maps. The reduction in dimensionality may be based on the dimensionality and stride of a filter of pre-3D downsample layer 407. For example, pre-3D downsample layer 407 may include a filter with dimension of 3×3×2, and may downsample using a stride of 2 (shifting filters by two pixels at each step). Pre-3D downsample layer 407 may receive feature maps with dimensions of 56×56×19 and output feature maps with dimensions of 27×27×9.

Intermediate layer group component 110 may be configured to effectuate operation of one or more intermediate layer groups and/or other layers/layer groups. One or more intermediate layer groups may include one or more of an intermediate three-dimensional squeeze layer, a first intermediate normalization layer, an intermediate three-dimensional padding layer, a first intermediate three-dimensional expand layer, a second intermediate three-dimensional expand layer, an intermediate concatenation layer, a second intermediate normalization layer, an intermediate activation layer, an intermediate combination layer, and/or other layers. For example, intermediate layer group A 321 may include inter-A 3D squeeze layer 411, inter-A norm layer A 412, inter-A 3D padding layer 413, inter-A 3D expand layer A 414, inter-A 3D expand layer B 415, inter-A concat layer 416, inter-A norm layer B 417, inter-A activation layer 418, inter-A combine layer 419, and/or other layers.

In some implementations, one or more intermediate layer groups may include eight intermediate layer groups as shown in FIG. 3. Intermediate layer group B 322, intermediate layer group C 323, intermediate layer group D 324, intermediate layer group E 325, intermediate layer group F 326, intermediate layer group G 327, and intermediate layer group H 328 may include the sequence of layers as shown in FIGS. 4A-4H. Other numbers of intermediate layer groups are contemplated.

An intermediate three-dimensional squeeze layer may receive one or more outputs from a layer preceding the individual intermediate layer group. For example, inter-A 3D squeeze layer 411 may receive one or more outputs from the layer preceding intermediate layer group A 321 (e.g., pre-3D downsample layer 407). Intermediate three-dimensional squeeze layers within different intermediate layer groups may include different numbers of 1×1×1 squeeze filters and may convolve the received output using a stride of 1 (as shown in FIGS. 5A-5D). Intermediate three-dimensional squeeze layers may convolve the received outputs to reduce the number of channels of the received output and produce reduced outputs. For example, inter-A 3D squeeze layer 411 may receive the output of pre-3D downsample layer 407 and reduce the number of channels from 96 to 32.

First intermediate normalization layer may normalize one or more outputs from the layer preceding the individual intermediate layer group. For example, inter-A norm layer A 412 may normalize one or more reduced outputs from inter-A 3D squeeze layer 411 to produce one or more normalized outputs. Inter-A norm layer A 412 may perform normalization using one or more batch normalizing transforms and/or other transforms.

An intermediate padding layer may increase the dimensionality of one or more outputs from the layer preceding the individual intermediate layer group. For example, inter-A 3D padding layer 413 may increase the dimensionality of one or more normalized outputs from inter-A norm layer 412 to produce one or more padded outputs. Inter-A 3D padding layer 413 may increase the dimensionality of one or more normalized outputs from 27×27×9 to 29×29×11 by padding the borders of the normalized outputs with zero values.

First intermediate expand layer may convolve one or more outputs from the layer preceding the individual intermediate layer group to produce one or more sets of feature maps. For example, inter-A 3D expand layer A 414 may convolve one or more padded outputs from inter-A 3D padding layer 413 to produce one or more sets of feature maps. First intermediate expand layers within different intermediate layer groups may include different numbers of 3×3×3 expand filters and may convolve the padded outputs using a stride of 1 (as shown in FIGS. 5A-5D). For example, inter-A 3D expand layer A 414 may convolve padded outputs having 32 channels and dimensions of 29×29×11 and produce one or more sets of feature maps having 128 channels and dimensions of 27×27×9. First intermediate expand layer may represent one of the main computing layers of the three-dimensional convolutional neural network. First intermediate expand layer may provide for feature detection within video segments processed by the three-dimensional convolutional neural network.

Second intermediate expand layer may convolve one or more outputs from the layer preceding the individual intermediate layer group to produce one or more sets of feature maps. For example, inter-A 3D expand layer B 415 may convolve one or more normalized outputs from inter-A norm layer A 412 to produce one or more sets of feature maps. Second intermediate expand layer within different intermediate layer groups may include different numbers of 1×1×1 expand filters and may convolve the normalized outputs using a stride of 1 (as shown in FIGS. 5A-5D). For example, inter-A 3D expand layer B 415 may convolve normalized outputs having 32 channels and dimensions of 27×27×9 and produce one or more sets of feature maps having 128 channels and dimensions of 27×27×9. Second intermediate expand layer may represent one of the main computing layers of the three-dimensional convolutional neural network. Second intermediate expand layer may provide for feature detection within video segments processed by the three-dimensional convolutional neural network.

An intermediate concatenation layer may concatenate two or more sets of feature maps from different layers to produce one or more sets of concatenated feature maps. For example, inter-A concat layer 416 may concatenate one or more sets of feature maps from inter-A 3D expand layer A 414 and one or more sets of feature maps from inter-A 3D expand layer B 415. Individual sets of feature maps from inter-A 3D expand layer A 414 and inter-A 3D expand layer B 415 may have the same numbers of channels and dimensions: 128 channels and dimensions of 27×27×9. The produced set of concatenated feature maps may have 256 channels and dimensions of 27×27×9.

Second intermediate normalization layer may normalize one or more sets of concatenated feature maps. For example, inter-A norm layer B 417 may normalized one or more sets of concatenated feature maps from inter-A concat layer 416 to produce one or more normalized sets of concatenated feature maps. Inter-A norm layer B 417 may perform normalization using one or more batch normalizing transforms and/or other transforms.

An intermediate activation layer may apply an activating function to one or more sets of concatenated feature maps. For example, inter-A activation layer 418 may apply an activating function to one or more normalized sets of concatenated feature maps from inter-A norm layer B 417 to produce one or more sets of activated feature maps. In some implementations, inter-A activation layer 418 may include a ReLU (Rectified Linear Unit), and/or other activating functions.

An intermediate combination layer may combines one or more sets of concatenated feature maps and one or more outputs from the layer preceding the individual intermediate layer group. For example, inter-A combine layer 419 may combine one or more sets of activated feature maps from inter-A activation layer 418 and one or more outputs from the layer preceding intermediate layer group A 321 (e.g., pre-3D downsample layer 407) to produce one or more sets of combined feature maps.

The intermediate combination layer may provide shortcut connections within the three-dimensional convolutional neural network. Shortcut connections may bypass one or more convolution operations. The shortcut connections may provide for summation of the input to the individual intermediate layer groups with the outputs of the convolution operations within the individual intermediate layer groups. The shortcut connections may provide identity mapping for the three-dimensional convolutional neural network. The shortcut connections may provide residual learning function for the three-dimensional convolutional neural network. Residual learning function may increase the accuracy and learning rate of the three-dimensional convolutional neural network.

One or more sets of activated feature maps from an intermediate activation layer (e.g., inter-A activation layer 418) and one or more outputs from the layer preceding the individual intermediate layer group (e.g., pre-3D downsample layer 407) may have the different numbers of channels. For example, outputs from inter-A activation layer 418 may have 256 channels and outputs from pre-3D downsample layer 407 may have 96 channels. In some implementations, one or more intermediate layer groups may include an intermediate three-dimensional bypass layer. The intermediate three-dimensional bypass layer may convolve one or more outputs from the layer preceding the individual intermediate layer group to match the dimensionality of the outputs to the dimensionality of the set of activated feature maps.

For example, inter-A 3D bypass layer 410 may receive one or more outputs from the layer preceding intermediate layer group A 321 (e.g., pre-3D downsample layer 407). Intermediate three-dimensional bypass layers within different intermediate layer groups may include different numbers of 1×1×1 filters and may convolve the received output using a stride of 1 (as shown in FIGS. 5A-5D). Intermediate three-dimensional bypass layers may convolve the received outputs to increase the number of channels of the received output and produce increased outputs. For example, inter-A 3D bypass layer 410 may receive the output of pre-3D downsample layer 407 and increase the number of channels from 96 to 256.

In some implementations, one or more intermediate layer groups may not include an activation layer, between the first intermediate normalization layer and the intermediate padding layer, that applies an activating function to one or more outputs from the layer preceding the individual intermediate layer group. For example, intermediate layer group A 321 may not include an activation layer between inter-A norm layer A 412 and inter-A 3D padding layer 413. Absence of an activation layer between inter-A norm layer A 412 and inter-A 3D padding layer 413 may improve the accuracy of the three-dimensional convolutional neural network.

Downsampling layer component 112 may be configured to effectuate operation of one or more three-dimensional downsampling layers and/or other layers/layer groups. One or more three-dimensional downsampling layers may include one or more three-dimensional downsampling layers between two intermediate layer groups, and/or other layers. For example, for three-dimensional convolutional neural network with eight intermediate layer groups, one or more three-dimensional downsampling layers may include 3D downsampling layer A 331 between intermediate layer group C 323 and intermediate layer group D 324 (shown in FIGS. 3 and 4D), and 3D downsampling layer B 332 between intermediate layer group G 327 and intermediate layer group H 328 (shown in FIGS. 3 and 4H).

3D downsampling layer A 331 may receive one or more outputs from intermediate layer group C 323 and downsample the one or more outputs. 3D downsampling layer A 331 may receive one or more sets of combined feature maps from inter-C combine layer 439 and downsample the set(s) of combined feature maps. 3D downsampling layer A 331 may perform downsampling using a max pooling and/or other downsampling methods. 3D downsampling layer A 331 may include a filter with dimension of 3×3×2 and may downsample using a stride of 2. Downsampling the set(s) of combined feature maps may reduce the dimensionality of the set(s) of combined feature maps. Downsampling layer A 331 may receive set(s) of combined feature maps with dimensions of 27×27×9 and output set(s) of combined feature maps with dimensions of 13×13×4.

3D downsampling layer B 332 may receive one or more outputs from intermediate layer group G 327 and downsample the one or more outputs. 3D downsampling layer B 332 may receive one or more sets of combined feature maps from inter-G combine layer 479 and downsample the set(s) of combined feature maps. 3D downsampling layer B 332 may perform downsampling using a max pooling and/or other downsampling methods. 3D downsampling layer B 332 may include a filter with dimension of 3×3×2 and may downsample using a stride of 2. Downsampling the set(s) of combined feature maps may reduce the dimensionality of the set(s) of combined feature maps. 3D downsampling layer B 332 may receive set(s) of combined feature maps with dimensions of 13×13×4 and output set(s) of combined feature maps with dimensions of 6×6×2.

Final layer group component 114 may be configured to effectuate operation of a final layer group and/or other layers/layer groups. The final layer group may include one or more of a final dropout layer, a final three-dimensional convolution layer, a final activation layer, a final normalization layer, a final three-dimensional downsampling layer, a final flatten layer, and/or other layers. For example, final layer group 340 may include final drop layer 491, final 3D convolution layer 492, final activation layer 493, final norm layer 494, final 3D downsample layer 495, final flatten layer 496, and/or other layer.

A final dropout layer may receive one or more outputs from a layer preceding the final layer group. For example, final drop layer 491 may receive one or more outputs from a layer preceding final layer group 340 (e.g., inter-H combine layer 489). The final dropout layer may reduce an overfitting from the received outputs to produce one or more dropped outputs. For example, final drop layer 491 may reduce overfitting from the three-dimensional convolutional neural network by dropping filters with a 50 percent probability during training of the three-dimensional convolutional neural network.

A final three-dimensional convolution layer may convolve one or more outputs from the layer preceding the final layer group to produce one or more sets of feature maps. For example, final 3D convolution layer 492 may convolve one or more dropped outputs from final drop layer 491 to produce one or more sets of feature maps. Final 3D convolution layer 492 may include one thousand 1×1×1 filters and convolve the dropped outputs using a stride of 1. Final 3D convolution layer 492 may convolve dropped outputs having 1024 channels and dimensions of 6×6×2 and produce one or more sets of feature maps having 1000 channels and dimensions of 6×6×2.

A final activation layer may apply an activating function to one or more sets of feature maps. For example, final activation layer 493 may apply an activating function to one or more sets of feature maps from final 3D convolution layer 492 to produce one or more sets of activated feature maps. In some implementations, final activation layer 493 may include a ReLU (Rectified Linear Unit), and/or other activating functions.

Final normalization layer may normalize one or more sets of feature maps. For example, final norm layer 494 may normalize one or more sets of activated feature maps from final activated layer 493 to produce one or more normalized sets of activated feature maps. Final norm layer 494 may perform normalization using one or more batch normalizing transforms and/or other transforms.

A final three-dimensional downsampling layer may downsample one or more sets of feature maps. For example, final 3D downsample layer 495 may downsample one or more normalized sets of activated feature maps from final norm layer 494 to produce one or more downsampled sets of activated feature maps. Final 3D downsample layer 495 may perform downsampling using an average pooling and/or other downsampling methods. Final 3D downsample layer 495 may include a filter with dimension of 6×6×2, and may downsample using a stride of 1. Downsampling normalized sets of activated feature maps may reduce the dimensionality of the normalized sets of activated feature maps. Final 3D downsample layer 495 may receive feature maps with dimensions of 6×6×2 and output feature maps with dimensions of 1×1×1.

A final flatten layer may convert one or more sets of feature maps into one or more spatiotemporal feature vectors. For example, final flatten layer 496 may convert one or more downsampled sets of activated feature map from final 3D downsample layer 495 into one or more spatiotemporal feature vectors. Final flatten layer 496 may receive one or more feature maps having 1000 channels and dimensions of 1×1×1 and output one or more spatiotemporal feature vectors having 1000 values.

LSTM component 116 may be configured to input one or more sets of spatiotemporal feature vectors into a long short-term memory network (e.g., LSTM 520). The long short-term memory network may determine one or more sets of predicted spatiotemporal feature vectors based on the one or more sets of spatiotemporal feature vectors and/or other information. The long short-term memory network may determine a first set of predicted spatiotemporal feature vectors based on the first set of spatiotemporal feature vectors, and/or other information. The long short-term memory network may determine a second set of predicted spatiotemporal feature vectors based on the second set of spatiotemporal feature vectors, and/or other information.

The long short-term memory network may be trained with video content including highlights and/or other information. Training the long short-term memory network with highlights may allow the long short-term memory network to predict the next and/or prior spatiotemporal feature vectors in video highlights. In some implementations, individual predicted spatiotemporal feature vectors corresponding to the individual video segments may characterize a prediction of a video segment following the individual video segments within the duration. In some implementations, individual predicted spatiotemporal feature vectors for the individual video segments may characterize a prediction of a video segment preceding the individual video segments within the duration.

Figure 7A:
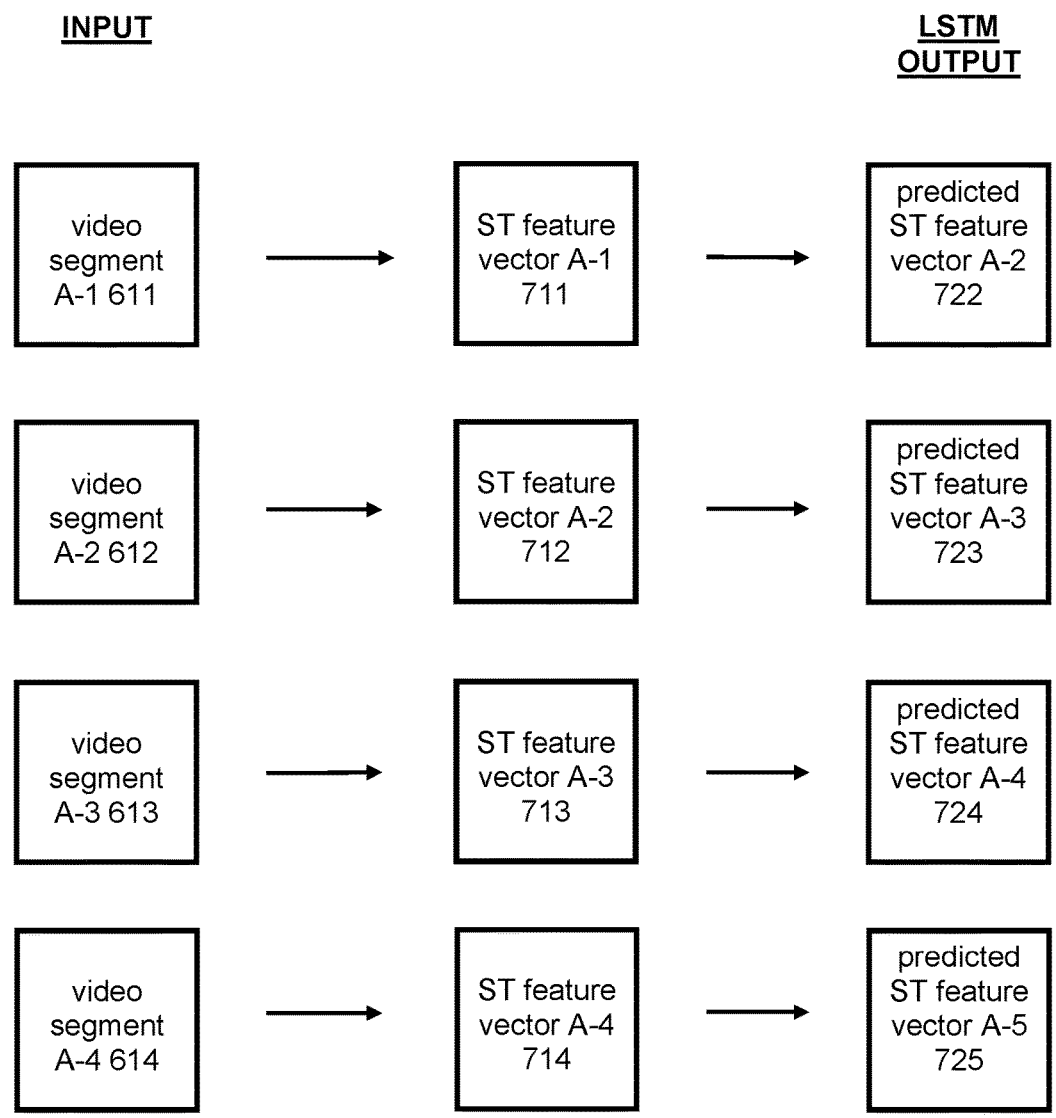
FIGS. 7A-7B illustrates exemplary inputs and outputs of a three-dimensional convolutional neural network system.
Figure 7B:
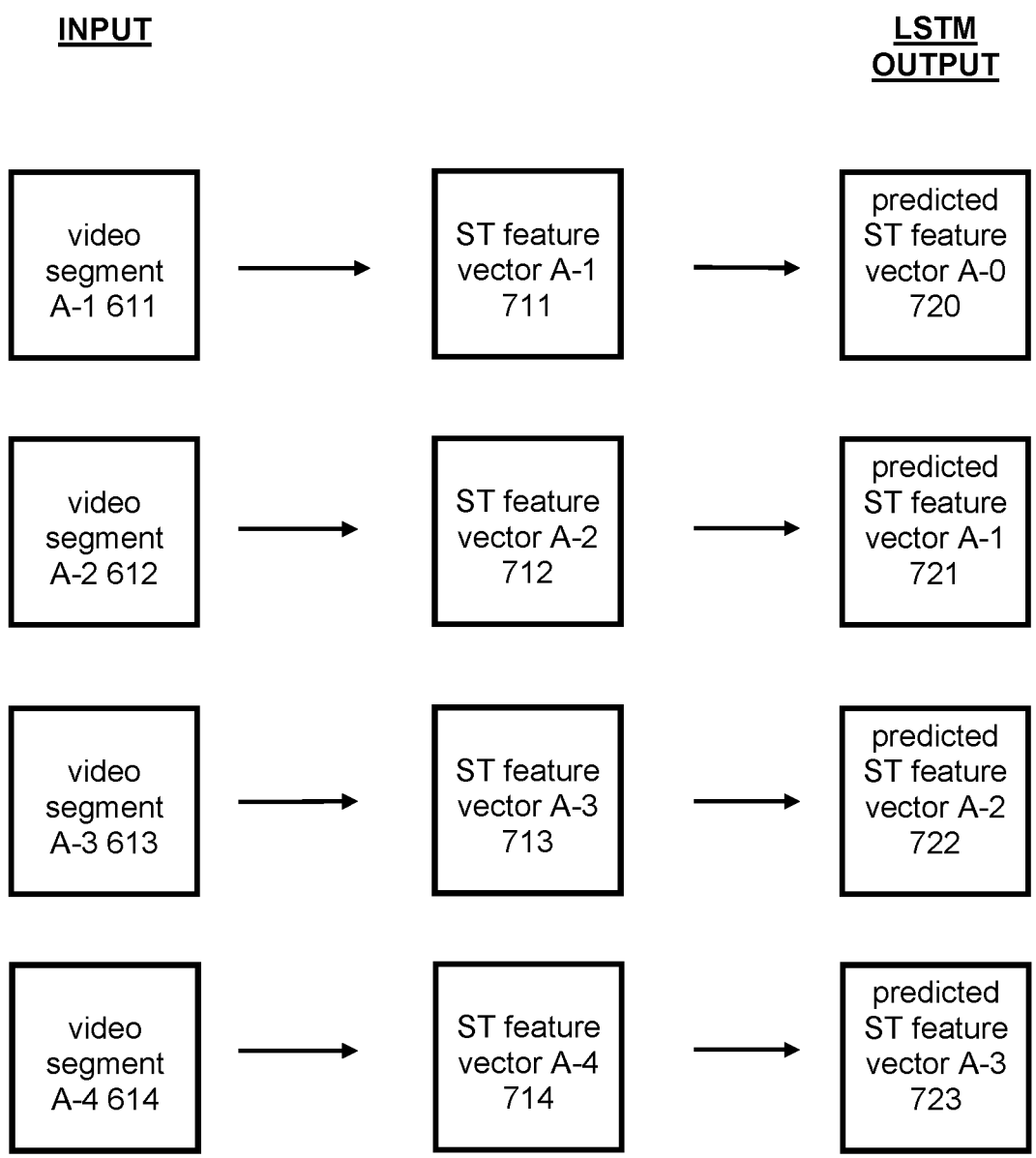

FIGS. 7A-7B illustrates exemplary inputs for a three-dimensional convolutional neural network system and outputs for long short-term memory network. Inputs to the three-dimensional convolutional neural network system may include video segment A-1 611, video segment A-2 612, video segment A-3 613, video segment A-4 614, and/or other video segments. Based on video segment A-1 611, final flatten layer 496 output spatiotemporal feature vector A-1 711. Based on video segment A-2 612, final flatten layer 496 output spatiotemporal feature vector A-2 712. Based on video segment A-3 613, final flatten layer 496 output spatiotemporal feature vector A-3 713. Based on video segment A-4 614, final flatten layer 496 output spatiotemporal feature vector A-4 714.

As shown in FIG. 7A, the long short-term memory network may output predicted spatiotemporal feature vectors that characterize a prediction of a video segment following the inputted video segment. For example, based on spatiotemporal feature vector A-1 711, the long short-term memory network may output predicted spatiotemporal feature vector A-2 722. Predicted spatiotemporal feature vector A-2 722 may characterize a prediction of video segment A-2 612 based on video segment A-1 611. Based on spatiotemporal feature vector A-2 712, the long short-term memory network may output predicted spatiotemporal feature vector A-3 723. Predicted spatiotemporal feature vector A-3 723 may characterize a prediction of video segment A-3 613 based on video segment A-2 612. Based on spatiotemporal feature vector A-3 713, the long short-term memory network may output predicted spatiotemporal feature vector A-4 724. Predicted spatiotemporal feature vector A-4 724 may characterize a prediction of video segment A-4 614 based on video segment A-3 613.

As shown in FIG. 7B, the long short-term memory network may output predicted spatiotemporal feature vectors that characterize a prediction of a video segment that precedes the inputted video segment. For example, based on spatiotemporal feature vector A-2 712, the long short-term memory network may output predicted spatiotemporal feature vector A-1 721. Predicted spatiotemporal feature vector A-1 721 may characterize a prediction of video segment A-1 611 based on video segment A-2 612. Based on spatiotemporal feature vector A-3 713, the long short-term memory network may output predicted spatiotemporal feature vector A-2 722. Predicted spatiotemporal feature vector A-2 722 may characterize a prediction of video segment A-2 612 based on video segment A-3 613. Based on spatiotemporal feature vector A-4 714, the long short-term memory network may output predicted spatiotemporal feature vector A-3 723. Predicted spatiotemporal feature vector A-3 723 may characterize a prediction of video segment A-3 613 based on video segment A-4 614.

Highlight component 118 may be configured to determine a presence of one or more highlight moments within the video content based on a comparison of one or more spatiotemporal feature vectors with one or more predicted spatiotemporal feature vectors, and/or other information. Highlight component 118 may determine a presence of one or more highlight moments within the video content based on a comparison of one or more of the first set of spatiotemporal feature vectors with one or more predicted spatiotemporal feature vectors of the first set of predicted spatiotemporal feature vectors, and/or other information. In some implementations, the comparison of the one or more spatiotemporal feature vectors of the first set of spatiotemporal feature vectors with the one or more predicted spatiotemporal feature vectors of the first set of predicted spatiotemporal feature vectors may include a comparison of the second spatiotemporal feature vector with the first predicted spatiotemporal feature vector.

Figure 8:
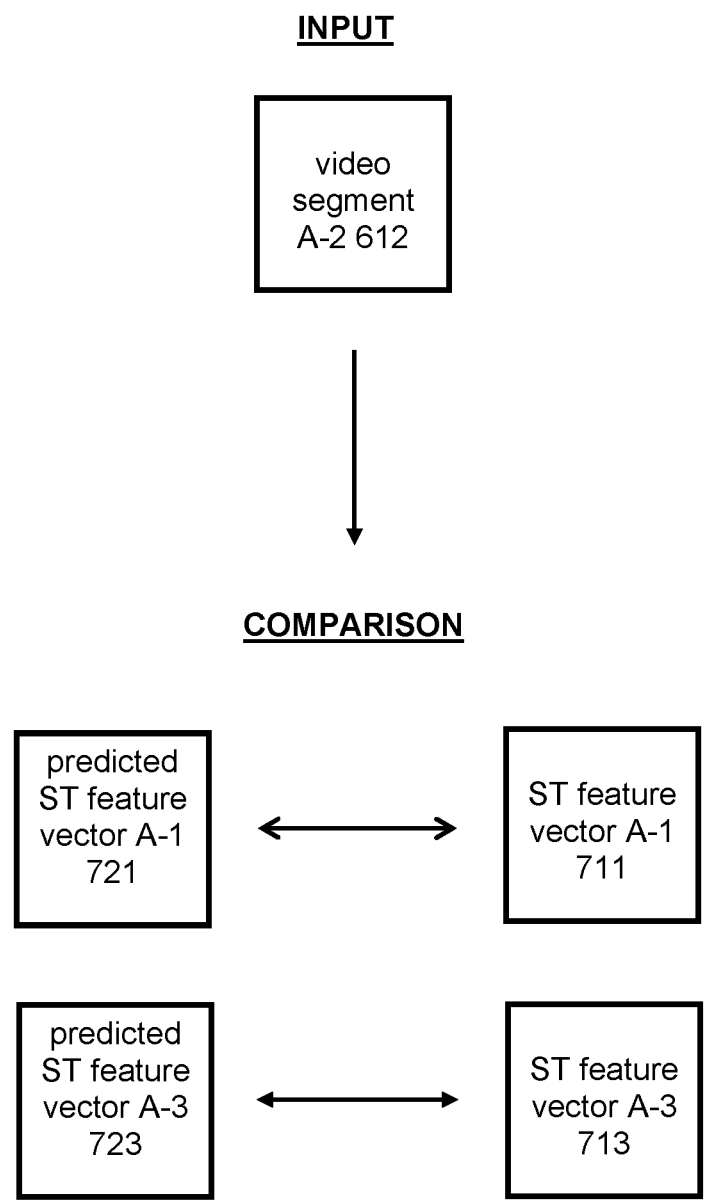
FIG. 8 illustrates exemplary comparisons for video highlight detection.

For example, FIG. 8 illustrates exemplary comparisons of spatiotemporal feature vectors with predicted spatiotemporal feature vectors for video highlight detection. As shown in FIG. 8, input to the three-dimensional convolutional neural network may include video segment A-2 612. Based on video segment A-2 612, the long short-term memory network may output predicted spatiotemporal feature vector A-1 721 and predicted spatiotemporal feature vector A-3 723. Predicted spatiotemporal feature vector A-1 721 may characterize a prediction of video segment A-1 611 based on video segment A-2 612. Predicted spatiotemporal feature vector A-3 723 may characterize a prediction of video segment A-3 613 based on video segment A-2 612.

Highlight component 118 may determine a presence of a highlight moment within video content 600 based on a comparison of predicted spatiotemporal feature vector A-1 721 with spatiotemporal feature vector A-1 711 and/or a comparison of predicted spatiotemporal feature vector A-3 723 with spatiotemporal feature vector A-3 711. The presence of a highlight moment within video content 600 may be determined based on a difference between predicted spatiotemporal feature vector A-1 721 and spatiotemporal feature vector A-1 711 meeting or being below a threshold and/or a difference between predicted spatiotemporal feature vector A-3 723 and spatiotemporal feature vector A-3 713 meeting or being below the threshold.

The difference between a spatiotemporal feature vector and a predicted spatiotemporal feature vector meeting or being below the threshold may indicate that the long short-term memory network accurately predicted the next/prior feature in a highlight content, and may indicate that video content 600 include a highlight moment. The difference between a spatiotemporal feature vector and a predicted spatiotemporal feature vector not meeting or being above the threshold may indicate that the long short-term memory network did not accurately predict the next/prior feature in a highlight content, and may indicate that video content 600 does not include a highlight moment. The use of predicted spatiotemporal feature vectors that characterizes a prediction of a video segment that precedes the inputted video segment and predicted spatiotemporal feature vectors that characterizes a prediction of a video segment that follows the inputted video segment may improve the quality of video highlight detection with two reconstruction errors.

In some implementations, highlight component 118 may determine a presence of one or more highlight moments within the video content further based on a comparison of one or more of the second set of spatiotemporal feature vectors with one or more predicted spatiotemporal feature vectors of the second set of predicted spatiotemporal feature vectors, and/or other information. For example, the three-dimensional convolutional neural network system may include a first three-dimensional convolutional neural network trained for video highlight detection using video segments of a certain number of video frames (e.g., sixteen video frames) and a second three-dimensional convolutional neural network trained for video highlight detection using video segments of different number of video frames (e.g., twenty-four video frames). Using different three-dimensional convolutional neural networks may allow for detection of highlight moments of different durations. For example, the first three-dimensional convolutional neural network may be used to detect highlight moments of 0.5 second and the second three-dimensional convolutional neural network may be used to detect highlight moments of 0.75 second.

In some implementations, highlight component 118 may determine a presence of one or more highlight moments within the video content based on multiple comparisons of spatiotemporal feature vectors with predicted spatiotemporal feature vectors. Highlight component 118 may determine a presence of a highlight moment within video content 600 based on differences between multiple spatiotemporal feature vectors and multiple predicted spatiotemporal feature vector meeting or being below a threshold.

For example, highlight component 118 may determine a presence of a highlight moment based on a certain number of comparisons of spatiotemporal feature vectors with predicted spatiotemporal feature vectors meeting or being below a threshold (e.g., two of three comparisons meeting or being below the threshold) and/or based on a certain number of consecutive comparisons of spatiotemporal feature vectors with predicted spatiotemporal feature vectors meeting or being below a threshold (e.g., three consecutive comparisons meeting or being below the threshold). Highlight component 118 may determine a presence of a highlight moment based on comparisons of spatiotemporal feature vectors with predicted spatiotemporal feature vectors from multiple three-dimensional convolutional neural network (e.g., the first three-dimensional convolutional neural network used to detect highlight moments of 0.5 second and the second three-dimensional convolutional neural network used to detect highlight moments of 0.75 second) meeting or being below a threshold. Use of multiple comparisons for highlight detection may allow for higher quality detection of highlight moments and reduce false detection of highlight moments.

Categorization component 120 may be configured to input two or more spatiotemporal feature vectors into a categorization layer (e.g., categorization layer 510). The categorization layer may provide an affline transformation of final flatten layer 496 (AX+B). The categorization layer may be trained by a backpropagation algorithm (e.g., gradient descent). The categorization layer may be trained with one or more datasets, such as the Sport-1M dataset and/or other datasets.

The categorization layer may provide a link between spatiotemporal features and categories. The categorization layer may determine a category for the video content based on the two or more spatiotemporal feature vectors. For example, the categorization layer may determine a category for the video content based on two or more spatiotemporal feature vectors of the first set of spatiotemporal feature vectors. For example, the first set of spatiotemporal feature vectors may include a spatiotemporal feature vector of a rolling ball and a spatiotemporal feature vector of a person wearing a jersey. The categorization layer may combine these information and determine a category for the video content as "soccer." Other types of categories and determinations of categories are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, 112, 114, 116, 118, and/or 120 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, 112, 114, 116, 118, and/or 120 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
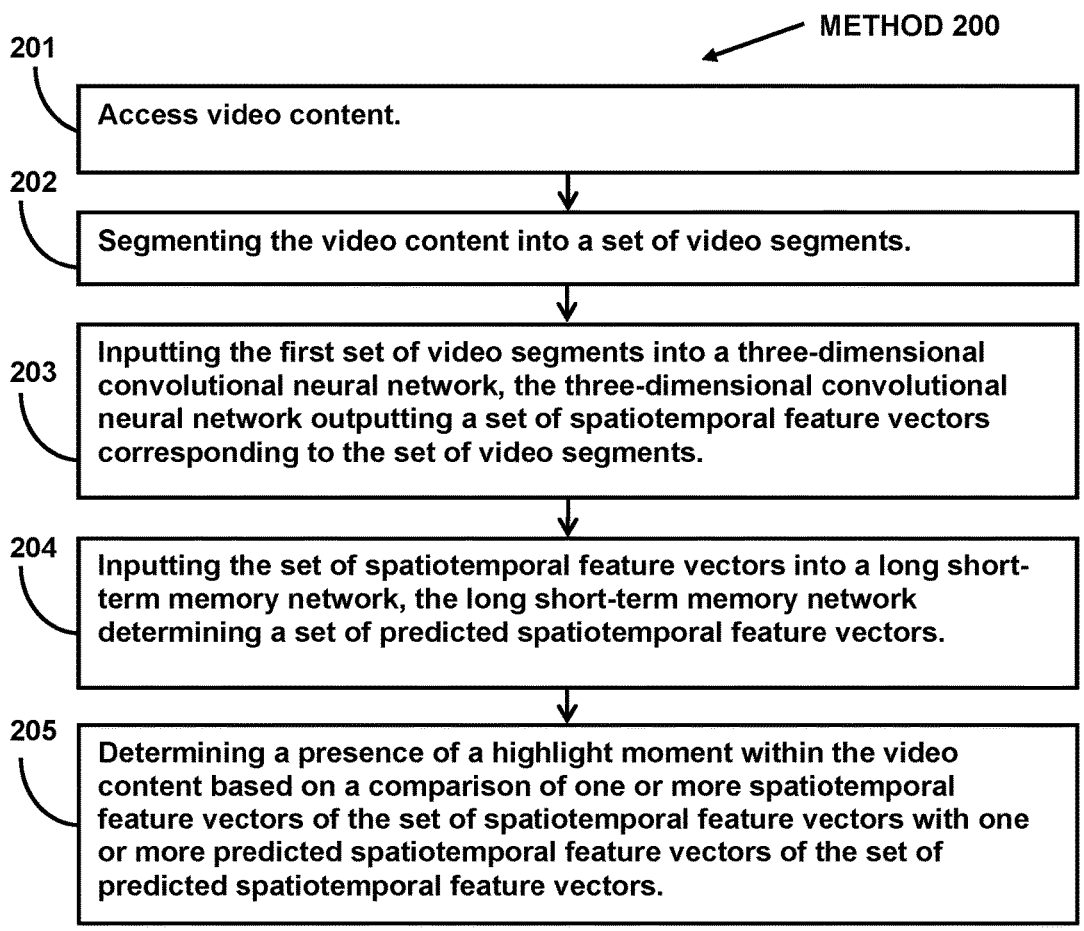
FIG. 2 illustrate a method for using a three-dimensional convolutional neural network system for video highlight detection.

FIG. 2 illustrates method 200 for using a three-dimensional convolutional neural network system for video highlight detection. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video content may be accessed. The video content may have a duration. In some implementations, operation 201 may be performed by a processor component the same as or similar to access component 102 (shown in FIG. 1 and described herein).

At operation 202, the video content may be segmented into a set of video segment. Individual video segments within the set of video segments may include a number of video frames. The set of video segments may comprise a first video segment and a second video segment. The second video segment may follow the first video segment within the duration. In some implementations, operation 202 may be performed by a processor component the same as or similar to segment component 104 (shown in FIG. 1 and described herein).

At operation 203, the set of video segments may be inputted into a three-dimensional convolutional neural network. The three-dimensional convolutional neural network may output a set of spatiotemporal feature vectors corresponding to the set of video segments. In some implementations, operation 203 may be performed by a processor component the same as or similar to input component 106 (shown in FIG. 1 and described herein).

At operation 204, the set of spatiotemporal feature vectors may be inputted into a long short-term memory network. The long short-term memory network may determine a set of predicted spatiotemporal feature vectors based on the set of spatiotemporal feature vectors. In some implementations, operation 204 may be performed by a processor component the same as or similar to LSTM component 116 (shown in FIG. 1 and described herein).

At operation 205, a presence of a highlight moment within the video content may be determined. The presence of the highlight moment within the video may be determined based on a comparison of one or more spatiotemporal feature vectors of the set of spatiotemporal feature vectors with one or more predicted spatiotemporal feature vectors of the set of predicted spatiotemporal feature vectors. In some implementations, operation 205 may be performed by a processor component the same as or similar to highlight component 118 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A three-dimensional convolutional neural network system for video highlight detection, the system comprising:
one or more physical processors configured by machine-readable instructions to:
  access video content, the video content having a duration;
  segment the video content into a first set of video segments, individual video segments within the first set of video segments including a first number of video frames, the first set of video segments comprising a first video segment and a second video segment, the second video segment following the first video segment within the duration;
  input the first set of video segments into a first three-dimensional convolutional neural network, the first three-dimensional convolutional neural network outputting a first set of spatiotemporal feature vectors corresponding to the first set of video segments, wherein the first three-dimensional convolutional neural network includes a sequence of layers comprising:
    a preliminary layer group that, for the individual video segments:
      accesses a video segment map, the video segment map characterized by a height dimension, a width dimension, a number of video frames, and a number of channels,
      increases the dimensionality of the video segment map;
      convolves the video segment map to produce a first set of feature maps;
      applies a first activating function to the first set of feature maps;
      normalizes the first set of feature maps; and
      downsamples the first set of feature maps;
    one or more intermediate layer groups that, for the individual video segments:
      receives a first output from a layer preceding the individual intermediate layer group:
      convolves the first output to reduce a number of channels of the first output;
      normalizes the first output;
      increases the dimensionality of the first output;
      convolves the first output to produce a second set of feature maps;
      convolves the first output to produce a third set of feature maps;
      concatenates the second set of feature maps and the third set of feature maps to produce a set of concatenated feature maps;
      normalizes the set of concatenated feature maps;
      applies a second activating function to the set of concatenated feature maps; and
      combines the set of concatenated feature maps and the first output; and
    a final layer group that, for the individual video segments:
      receives a second output from a layer preceding the final layer group;
      reduces an overfitting from the second output;
      convolves the second output to produce a fourth set of feature maps;
      applies a third activating function to the fourth set of feature maps;
      normalizes the fourth set of feature maps;
      downsamples the fourth set of feature maps; and
      converts the fourth set of feature maps into a spatiotemporal feature vector;
  input the first set of spatiotemporal feature vectors into a long short-term memory network, the long short-term memory network determining a first set of predicted spatiotemporal feature vectors based on the first set of spatiotemporal feature vectors; and
  determine a presence of a highlight moment within the video content based on a comparison of one or more spatiotemporal feature vectors of the first set of spatiotemporal feature vectors with one or more predicted spatiotemporal feature vectors of the first set of predicted spatiotemporal feature vectors.

2. The system of claim 1, wherein individual predicted spatiotemporal feature vectors corresponding to the individual video segments characterizes a prediction of a video segment following the individual video segments within the duration.

3. The system of claim 1, wherein individual predicted spatiotemporal feature vectors for the individual video segments characterizes a prediction of a video segment preceding the individual video segments within the duration.

4. The system of claim 2, wherein:

the first set of spatiotemporal feature vectors includes a first spatiotemporal feature vector corresponding to the first video segment and a second spatiotemporal feature vector corresponding to the second video segment;

the first set of predicted spatiotemporal feature vectors includes a first predicted spatiotemporal feature vector determined based on the first spatiotemporal feature vector, the first predicted spatiotemporal feature vector characterizing a prediction of the second video segment; and the comparison of the one or more spatiotemporal feature vectors of the first set of spatiotemporal feature vectors with the one or more predicted spatiotemporal feature vectors of the first set of predicted spatiotemporal feature vectors includes a comparison of the second spatiotemporal feature vector with the first predicted spatiotemporal feature vector.

5. The system of claim 1, wherein the presence of the highlight moment within the video content is determined based on a difference between the one or more spatiotemporal feature vectors of the first set of spatiotemporal feature vectors and the one or more predicted spatiotemporal feature vectors of the first set of predicted spatiotemporal feature vectors meeting or being below a threshold.

6. The system of claim 1, wherein the one or more physical processors are further configured by machine-readable instructions to input two or more spatiotemporal feature vectors of the first set of spatiotemporal feature vectors into a categorization layer, the categorization layer determining a category for the video content based on the two or more spatiotemporal feature vectors of the first set of spatiotemporal feature vectors.

7. The system of claim 1, wherein the first number of video frames includes sixteen video frames.

8. The system of claim 1, wherein the one or more physical processors are further configured by machine-readable instructions to:

segment the video content into a second set of video segments, individual video segments within the second set of video segments including a second number of video frames, the second number of video frames being different from the first number of video frames;

input the second set of video segments into a second three-dimensional convolutional neural network, the second three-dimensional convolutional neural network outputting a second set of spatiotemporal feature vectors corresponding to the second set of video segments;

input the second set of spatiotemporal feature vectors into the long short-term memory network, the long short-term memory network determining a second set of predicted spatiotemporal feature vectors based on the second set of spatiotemporal feature vectors; and determine the presence of the highlight moment within the video content further based on a comparison of one or more spatiotemporal feature vectors of the second set of spatiotemporal feature vectors with one or more predicted spatiotemporal feature vectors of the second set of predicted spatiotemporal feature vectors.

9. The system of claim 1, wherein the first three-dimensional convolutional neural network is initialized with pre-trained weights from a trained two-dimensional convolutional neural network, the pre-trained weights from the trained two-dimensional convolutional neural network being stacked along a time dimension.

10. The system of claim 1, wherein the long short-term memory network is trained with second video content including highlights.

11. A method for using a three-dimensional convolutional neural network for video highlight detection, the method comprising:

accessing video content, the video content having a duration;

segmenting the video content into a first set of video segments, individual video segments within the first set of video segments including a first number of video frames, the first set of video segments comprising a first video segment and a second video segment, the second video segment following the first video segment within the duration;

inputting the first set of video segments into a first three-dimensional convolutional neural network, the first three-dimensional convolutional neural network outputting a first set of spatiotemporal feature vectors corresponding to the first set of video segments, wherein the first three-dimensional convolutional neural network includes a sequence of layers comprising:

a preliminary layer group that, for the individual video segments:
  accesses a video segment map, the video segment map characterized by a height dimension, a width dimension, a number of video frames, and a number of channels,
  increases the dimensionality of the video segment map;
  convolves the video segment map to produce a first set of feature maps;
  applies a first activating function to the first set of feature maps;
  normalizes the first set of feature maps; and
  downsamples the first set of feature maps;

one or more intermediate layer groups that, for the individual video segments:
  receives a first output from a layer preceding the individual intermediate layer group:
  convolves the first output to reduce a number of channels of the first output;
  normalizes the first output;
  increases the dimensionality of the first output;
  convolves the first output to produce a second set of feature maps;
  convolves the first output to produce a third set of feature maps;
  concatenates the second set of feature maps and the third set of feature maps to produce a set of concatenated feature maps;
  normalizes the set of concatenated feature maps;
  applies a second activating function to the set of concatenated feature maps; and
  combines the set of concatenated feature maps and the first output; and a final layer group that, for the individual video segments:
  receives a second output from a layer preceding the final layer group;
  reduces an overfitting from the second output;
  convolves the second output to produce a fourth set of feature maps;
  applies a third activating function to the fourth set of feature maps;
  normalizes the fourth set of feature maps;
  downsamples the fourth set of feature maps; and converts the fourth set of feature maps into a spatiotemporal feature vector;
inputting the first set of spatiotemporal feature vectors into a long short-term memory network, the long short-term memory network determining a first set of predicted spatiotemporal feature vectors based on the first set of spatiotemporal feature vectors; and
determining a presence of a highlight moment within the video content based on a comparison of one or more spatiotemporal feature vectors of the first set of spatiotemporal feature vectors with one or more predicted spatiotemporal feature vectors of the first set of predicted spatiotemporal feature vectors.

12. The method of claim 11, wherein individual predicted spatiotemporal feature vectors corresponding to the individual video segments characterizes a prediction of a video segment following the individual video segments within the duration.

13. The method of claim 11, wherein individual predicted spatiotemporal feature vectors for the individual video segments characterizes a prediction of a video segment preceding the individual video segments within the duration.

14. The method of claim 12, wherein:
the first set of spatiotemporal feature vectors includes a first spatiotemporal feature vector corresponding to the first video segment and a second spatiotemporal feature vector corresponding to the second video segment;
the first set of predicted spatiotemporal feature vectors includes a first predicted spatiotemporal feature vector determined based on the first spatiotemporal feature vector, the first predicted spatiotemporal feature vector characterizing a prediction of the second video segment; and
the comparison of the one or more spatiotemporal feature vectors of the first set of spatiotemporal feature vectors with the one or more predicted spatiotemporal feature vectors of the first set of predicted spatiotemporal feature vectors includes a comparison of the second spatiotemporal feature vector with the first predicted spatiotemporal feature vector.

15. The method of claim 11, wherein the presence of the highlight moment within the video content is determined based on a difference between the one or more spatiotemporal feature vectors of the first set of spatiotemporal feature vectors and the one or more predicted spatiotemporal feature vectors of the first set of predicted spatiotemporal feature vectors meeting or being below a threshold.

16. The method of claim 11, further comprising inputting two or more spatiotemporal feature vectors of the first set of spatiotemporal feature vectors into a categorization layer, the categorization layer determining a category for the video content based on the two or more spatiotemporal feature vectors of the first set of spatiotemporal feature vectors.

17. The method of claim 11, wherein the first number of video frames includes sixteen video frames.

18. The method of claim 11, further comprising:
segmenting the video content into a second set of video segments, individual video segments within the second set of video segments including a second number of video frames, the second number of video frames being different from the first number of video frames;
inputting the second set of video segments into a second three-dimensional convolutional neural network, the second three-dimensional convolutional neural network outputting a second set of spatiotemporal feature vectors corresponding to the second set of video segments;
inputting the second set of spatiotemporal feature vectors into the long short-term memory network, the long short-term memory network determining a second set of predicted spatiotemporal feature vectors based on the second set of spatiotemporal feature vectors; and
determining the presence of the highlight moment within the video content further based on a comparison of one or more spatiotemporal feature vectors of the second set of spatiotemporal feature vectors with one or more predicted spatiotemporal feature vectors of the second set of predicted spatiotemporal feature vectors.

19. The method of claim 11, wherein:
the first three-dimensional convolutional neural network is initialized with pre-trained weights from a trained two-dimensional convolutional neural network, the pre-trained weights from the trained two-dimensional convolutional neural network being stacked along a time dimension; and
the long short-term memory network is trained with second video content including highlights.

20. A three-dimensional convolutional neural network system for video highlight detection, the system comprising:
one or more physical processors configured by machine-readable instructions to:
access video content, the video content having a duration;
segment the video content into a first set of video segments, individual video segments within the first set of video segments including a first number of video frames, the first set of video segments comprising a first video segment and a second video segment, the second video segment following the first video segment within the duration;
input the first set of video segments into a first three-dimensional convolutional neural network, the first three-dimensional convolutional neural network outputting a first set of spatiotemporal feature vectors corresponding to the first set of video segments, wherein the first three-dimensional convolutional neural network includes a sequence of layers comprising:
a preliminary layer group that, for the individual video segments:
accesses a video segment map, the video segment map characterized by a height dimension, a width dimension, a number of video frames, and a number of channels,
increases the dimensionality of the video segment map;
convolves the video segment map to produce a first set of feature maps;
applies a first activating function to the first set of feature maps;
normalizes the first set of feature maps; and
downsamples the first set of feature maps;
one or more intermediate layer groups that, for the individual video segments:
receives a first output from a layer preceding the individual intermediate layer group:
convolves the first output to reduce a number of channels of the first output;
normalizes the first output;
increases the dimensionality of the first output;
convolves the first output to produce a second set of feature maps;
convolves the first output to produce a third set of feature maps;

concatenates the second set of feature maps and the third set of feature maps to produce a set of concatenated feature maps;

normalizes the set of concatenated feature maps;

applies a second activating function to the set of concatenated feature maps; and combines the set of concatenated feature maps and the first output; and a final layer group that, for the individual video segments:

receives a second output from a layer preceding the final layer group;

reduces an overfitting from the second output;

convolves the second output to produce a fourth set of feature maps;

applies a third activating function to the fourth set of feature maps;

normalizes the fourth set of feature maps;

downsamples the fourth set of feature maps; and converts the fourth set of feature maps into a spatiotemporal feature vector;

input the first set of spatiotemporal feature vectors into a long short-term memory network, the long short-term memory network determining a first set of predicted spatiotemporal feature vectors based on the first set of spatiotemporal feature vectors, individual predicted spatiotemporal feature vectors corresponding to the individual video segments characterizes a prediction of a video segment following the individual video segments within the duration and/or a video segment preceding the individual video segments within the duration; and determine a presence of a highlight moment within the video content based on a comparison of one or more spatiotemporal feature vectors of the first set of spatiotemporal feature vectors with one or more predicted spatiotemporal feature vectors of the first set of predicted spatiotemporal feature vectors;

wherein:

the first three-dimensional convolutional neural network is initialized with pre-trained weights from a trained two-dimensional convolutional neural network, the pre-trained weights from the trained two-dimensional convolutional neural network being stacked along a time dimension; and the long short-term memory network is trained with second video content including highlights.

* * * * *